United States Patent [19]

Henderson et al.

[11] Patent Number: 5,318,490
[45] Date of Patent: Jun. 7, 1994

[54] EXERCISE APPARATUS

[75] Inventors: William C. Henderson, Bellingham; Cole J. Dalton; Lawrence J. Graf, both of Snohomish, all of Wash.

[73] Assignee: Precor Incorporated, Bothell, Wash.

[21] Appl. No.: 864,428

[22] Filed: Apr. 6, 1992

Related U.S. Application Data

[63] Continuation-in-part of Ser. No. 713,732, Jun. 11, 1991, Pat. No. 5,129,872, which is a continuation-in-part of Ser. No. 670,329, Mar. 15, 1991.

[51] Int. Cl.$^5$ ............................................. A63B 22/04
[52] U.S. Cl. ................................... 482/53; 482/125
[58] Field of Search .................. 482/51, 52, 53, 121, 482/122, 123, 125, 126, 127

[56] References Cited

U.S. PATENT DOCUMENTS

| | | | |
|---|---|---|---|
| 1,872,256 | 8/1932 | Denney . | |
| 2,107,449 | 2/1938 | Marlowe | 128/33 |
| 2,969,060 | 1/1961 | Swanda et al. | 128/25 |
| 3,024,023 | 3/1962 | Steller | 272/73 |
| 3,628,791 | 12/1971 | Garcia | 272/83 |
| 3,745,990 | 7/1973 | Neis | 128/2 S |
| 4,188,030 | 2/1980 | Hooper | 272/73 |
| 4,463,945 | 8/1984 | Spector | 272/73 |
| 4,645,200 | 2/1987 | Hix | 272/73 |
| 4,657,244 | 4/1987 | Ross | 272/73 |
| 4,684,126 | 8/1987 | Dalebout et al. | 272/134 |
| 4,712,789 | 12/1987 | Brilando | 272/73 |
| 4,712,790 | 12/1987 | Szymski | 272/73 |
| 4,720,093 | 1/1988 | Del Mar | 272/70 |
| 4,796,881 | 1/1989 | Watterson | 272/72 |
| 4,798,379 | 1/1989 | Jenkins | 272/73 |
| 4,809,976 | 3/1989 | Berger | 272/138 |
| 4,830,362 | 5/1989 | Bull | 272/70 |
| 4,838,543 | 6/1989 | Armstrong et al. | 272/70 |
| 4,934,690 | 6/1990 | Bull | 272/70 |
| 5,129,872 | 7/1992 | Dalton et al. | 482/52 |

FOREIGN PATENT DOCUMENTS 2243794 3/1973 Fed. Rep. of Germany .
618118 8/1978 U.S.S.R. .

OTHER PUBLICATIONS

BF Goodrich Torsilastic ® Springs Brochure, B.F. Goodrich Company, Torsilastic Spring, Sales Dept. 1723, 500 S. Main St., Akron, Ohio 44218, 1986.

*Primary Examiner*—Stephen R. Crow
*Attorney, Agent, or Firm*—Christensen, O'Connor, Johnson & Kindness

[57] ABSTRACT

An exercise apparatus having foot beams (38a, 40a) rotatably mounted to an upright post member (140a) of a frame to rotate about a first axis (322). Hand levers (132a, 134a) are secured to pivot members (152a) pivotally mounted to the upright post member to rotate about a second axis (328). The hand levers are coupled by resilient linkage members (380) including elastomeric joints (382) to the foot levers so that as each foot lever rotates about the first axis, the corresponding hand lever normally rotates a related distance about the second axis. The linkage members are resiliently deformable to allow discontinuity between the rotation of the foot levers and hand levers when an exerciser exerts a differential force on the hand levers relative to the corresponding foot levers.

9 Claims, 12 Drawing Sheets

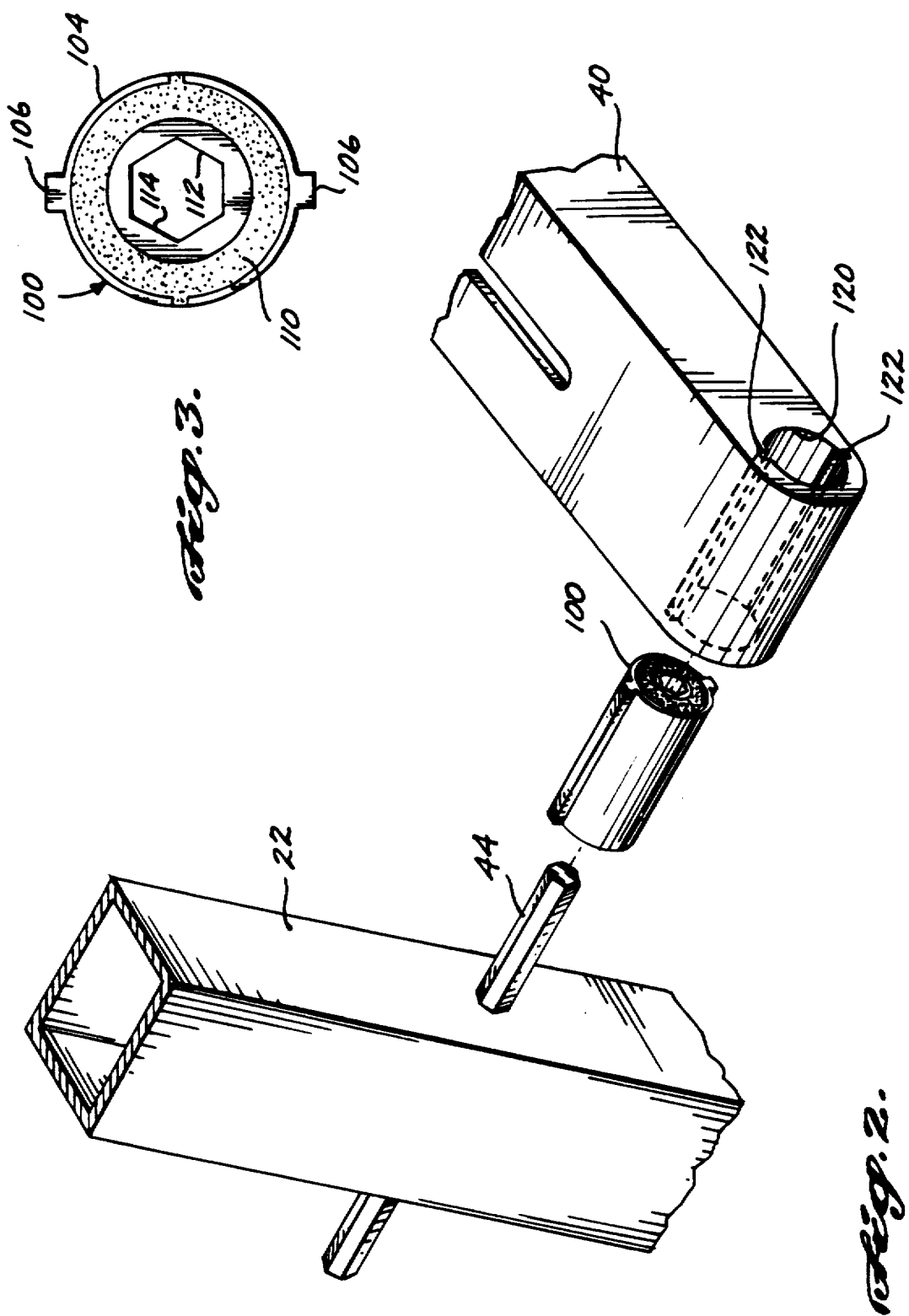

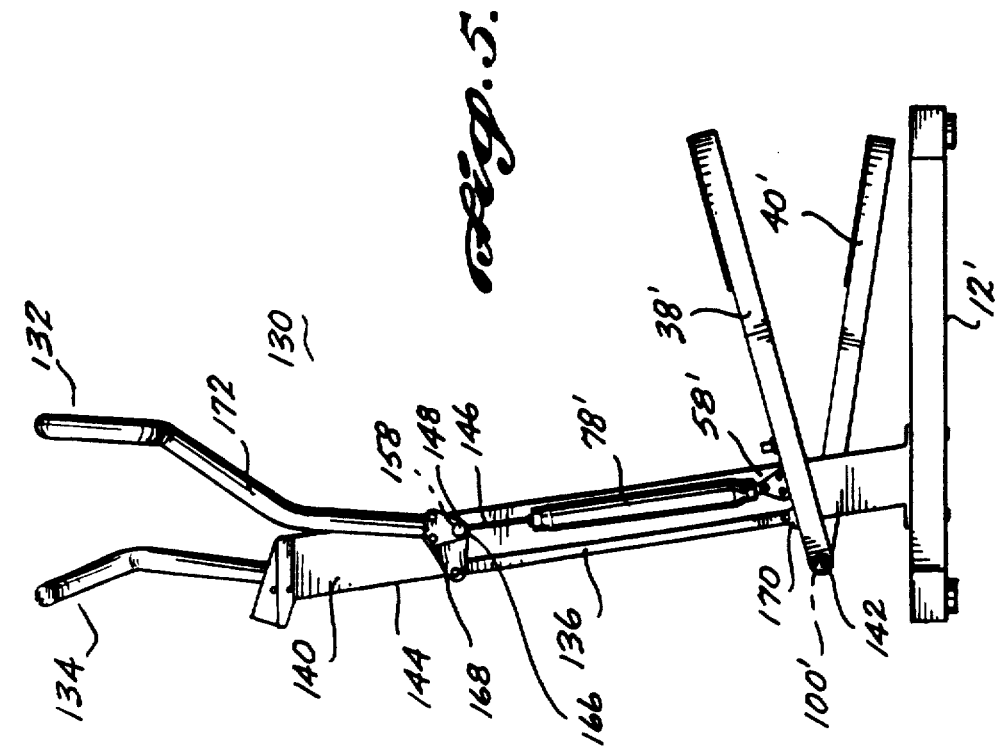
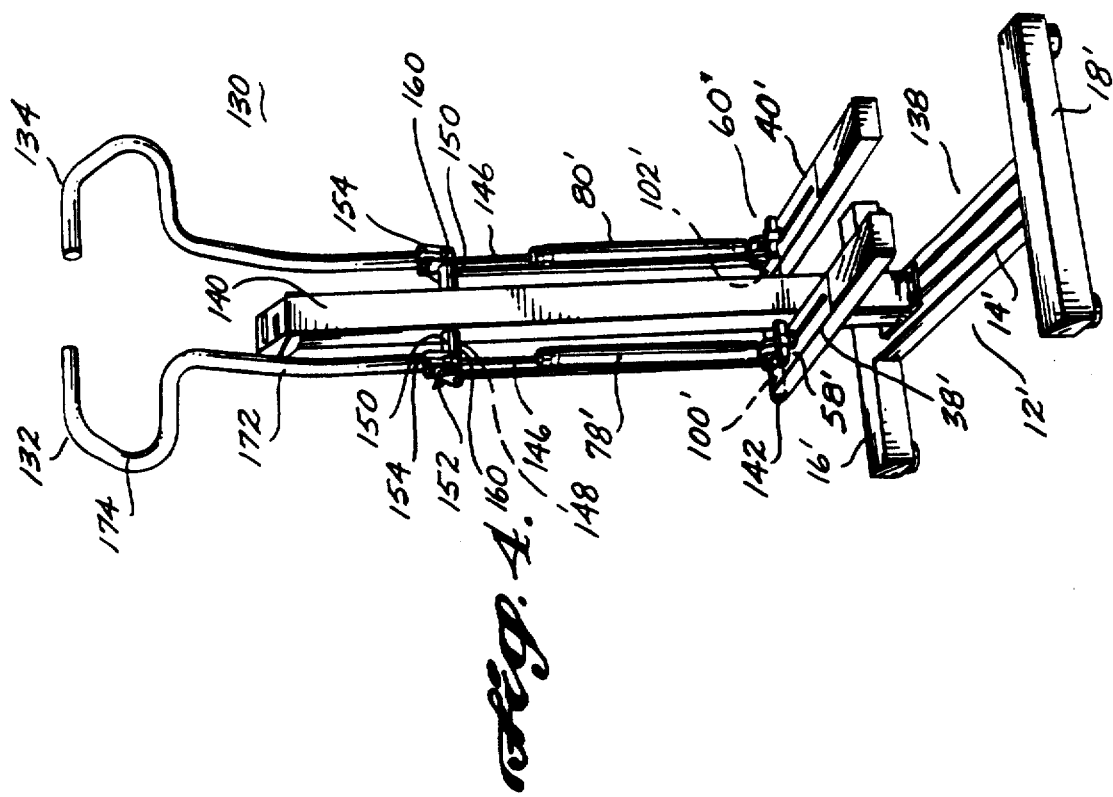

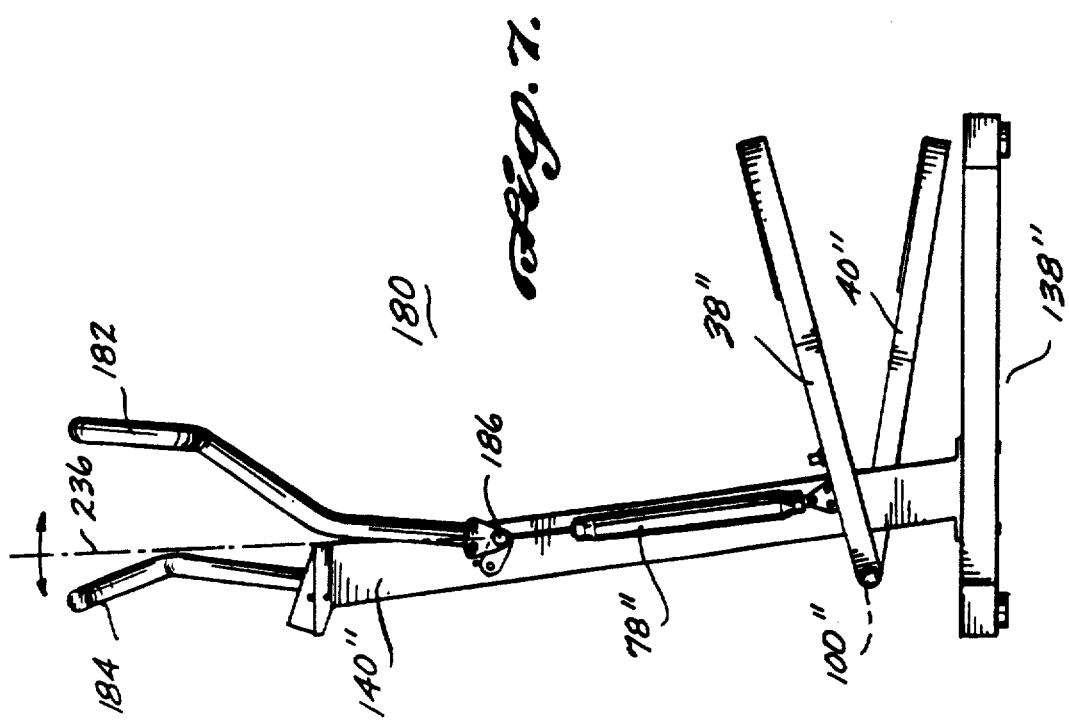
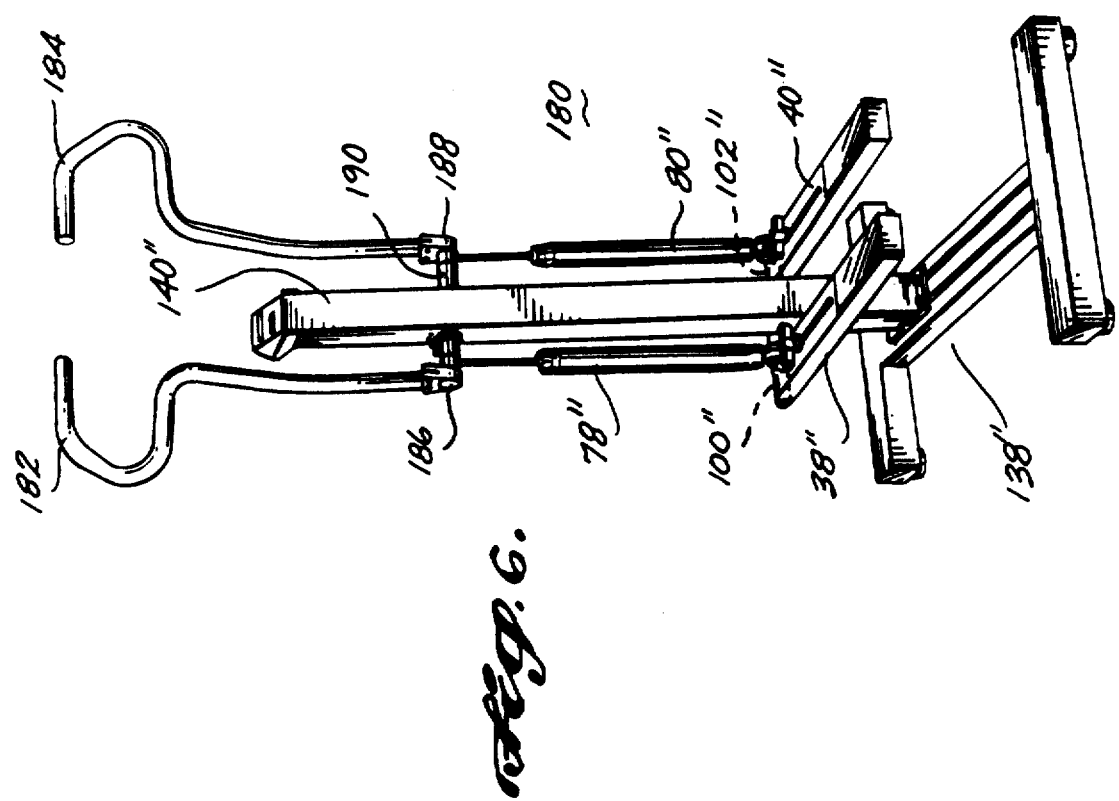

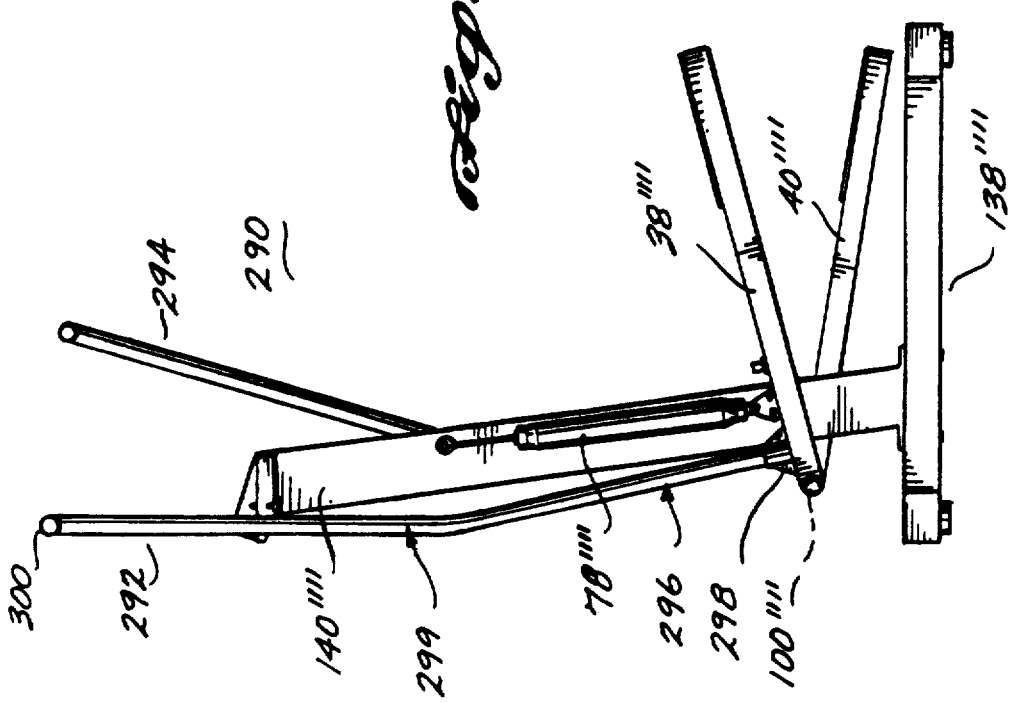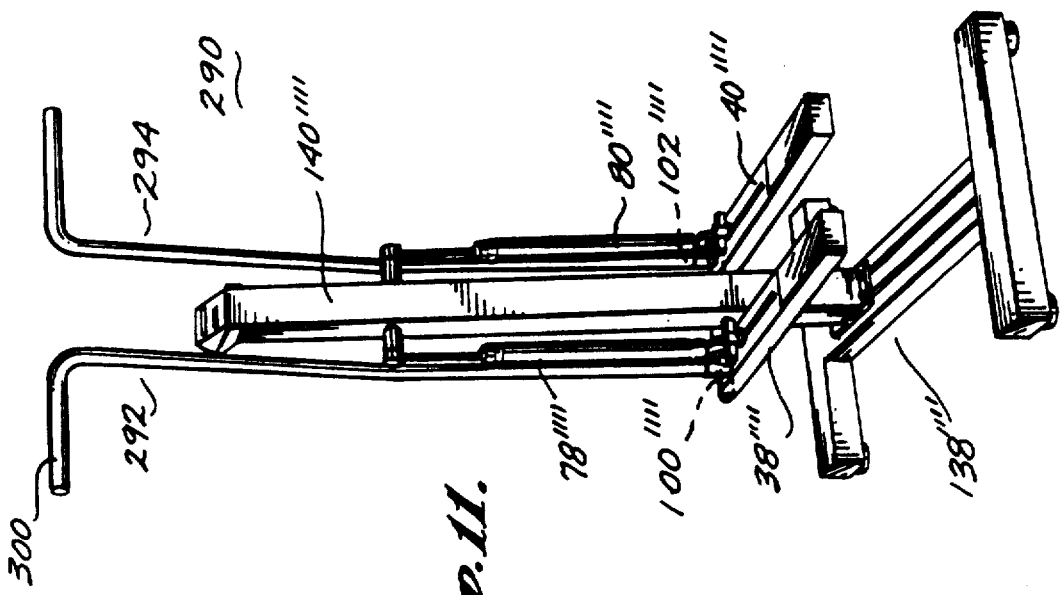

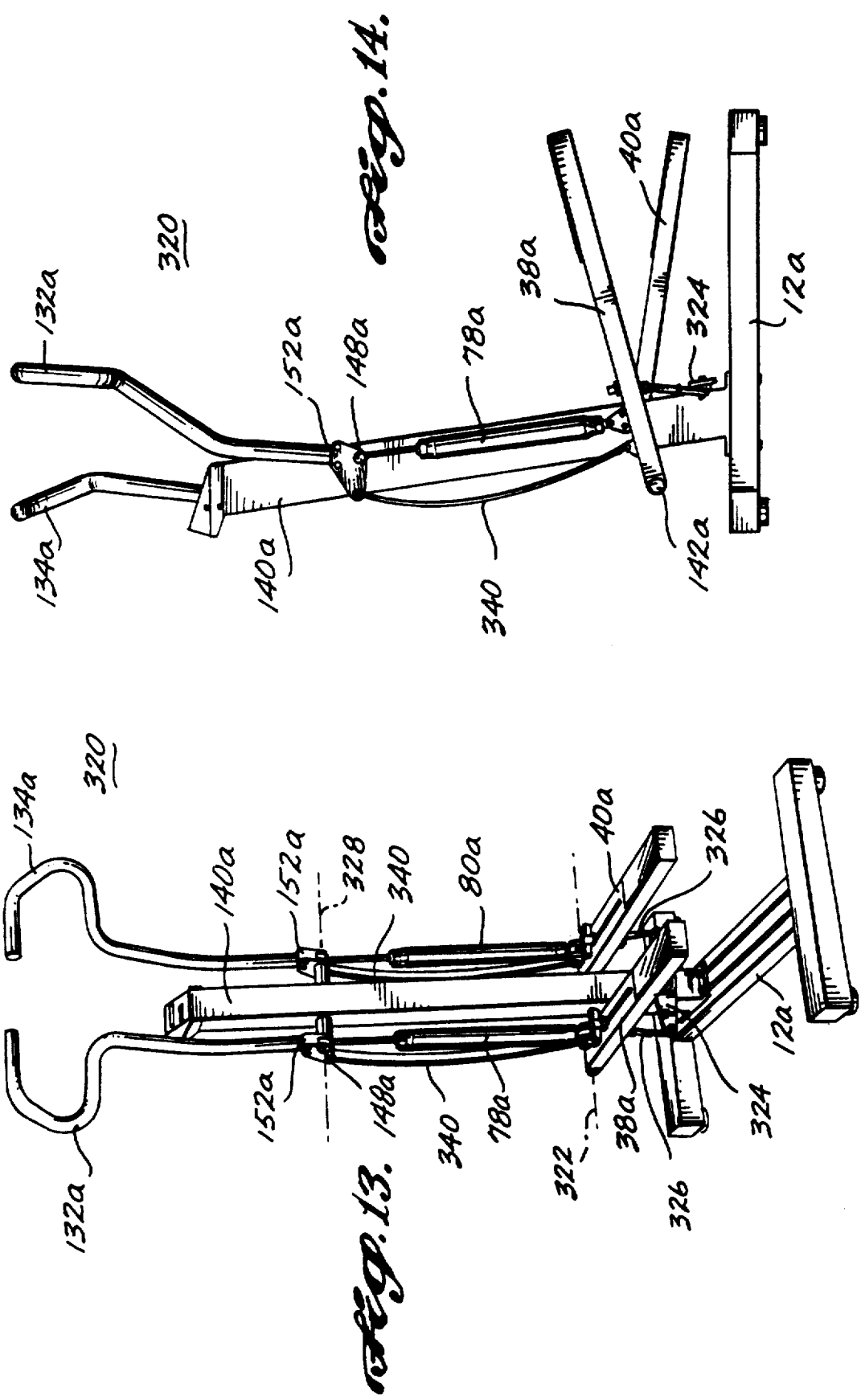

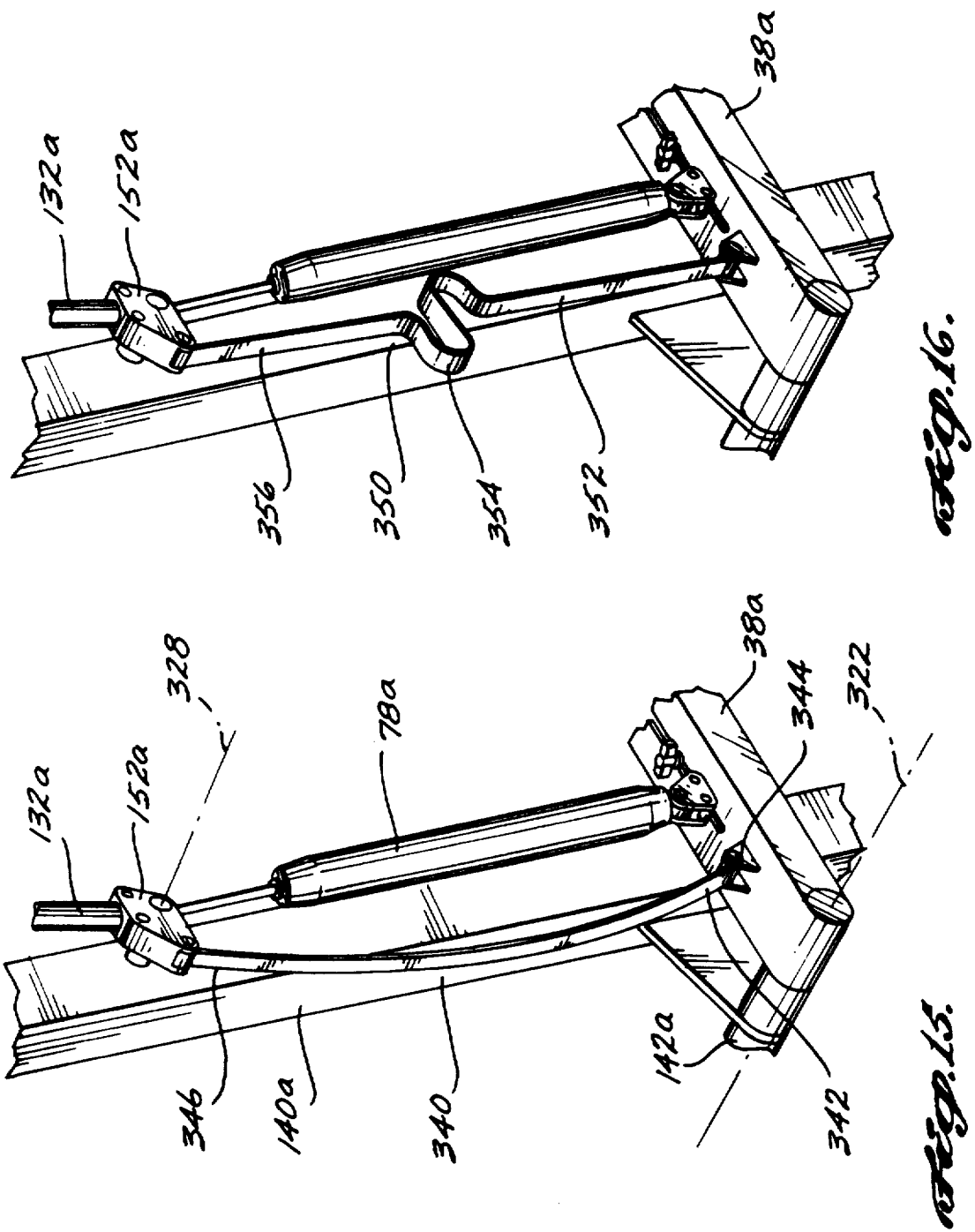

EXERCISE APPARATUS

RELATED U.S. PATENT APPLICATION

The present application is a continuation-in-part of application Ser. No. 07/713,732, filed Jun. 11, 1991, now U.S. Pat. No. 5,129,872 which in turn is a continuation-in-part of application Ser. No. 07/670,329, filed Mar. 15, 1991, pending.

FIELD OF THE INVENTION

The present invention relates to exercise equipment, and more particularly to exercise equipment of the type used to simulate climbing stairs or jogging.

BACKGROUND OF THE INVENTION

Exercise equipment designed to simulate climbing stairs or jogging has long been known. One known type of such exercise equipment includes a frame and two foot beams or pedals which are pivotally mounted to the frame. In this equipment, the pedals are depressed alternately as the user climbs or jogs in place. The pedals are returned to an upper, typically generally horizontal, position by one of a variety of biasing means.

One group of biasing means for returning the foot pedals to the upper position comprises a pair of coil springs, each of which are positioned beneath a respective one of the foot pedals, as disclosed in U.S. Pat. No. 3,628,791 and German Patent No. 2,243,794. The use of coil springs alone as a means for biasing the foot pedals on exercise apparatus to the upper position has been found to be undesirable because the resistance generated by the springs typically does not vary linearly with displacement of the foot pedals. Such nonlinear resistance makes it difficult to develop an even exercise cadence.

Another system for returning the foot pedals of a stair climbing exercise apparatus to the upper position is disclosed in U.S. Pat. No. 4,838,543 (the "'543 patent"). The '543 patent discloses a rope and pulley arrangement for returning the foot pedal from which the user has removed his or her weight to the upper position. The rope and pulley system comprises a pulley centrally located between and above the foot pedals and a rope trained about the pulley and attached to each of the foot pedals so that when one of the foot pedals is pressed down by the user, the rope attached thereto is pulled down which in turn causes the other end of the rope attached to the other foot pedal to be pulled up. As a result of this upward movement of the other end of the rope, the foot pedal attached thereto is moved to an upper position. Although the rope and pulley arrangement disclosed in the '543 patent functions satisfactorily, a desire exists to provide a mechanism for returning the unweighted pedal to the upper position which has a higher degree of reliability and durability than that of the rope and pulley arrangement disclosed in the '543 patent.

Torsion springs of the type comprising an elongate, metal coil spring fixed to a pivotally mounted member so that the longitudinal axis of the spring is parallel to or coaxial with the axis of rotation of the member have been used in exercise equipment for biasing various pivotally mounted lever mechanisms in a given direction and for opposing movement of such lever mechanisms in an opposite direction. For instance, U.S. Pat. No. 4,684,126 discloses a rowing exercise apparatus comprising a pair of arm levers, each having a torsion spring associated therewith for opposing movement of the arm levers in a first direction and for biasing the arm levers in an opposite direction. German Patent No. 2,145,884 discloses a foot exerciser for bedridden patients comprising two foot pedals which are pivotally mounted to a frame. The foot exerciser includes a torsion spring associated with each of the foot pedals for resisting movement of the pedals in a first direction and biasing the pedals in a second, opposite direction. Soviet Union Inventor's Certificate 618,118 discloses a gymnast's springboard comprising a pair of lever mechanisms and a pair of torsion springs associated with each of the lever mechanisms for urging the mechanisms in a first direction and opposing movement of the lever mechanisms in an opposite direction. The lever mechanisms engage a horizontal bed and urge the bed upwardly and oppose movement of the bed in a downward direction. In addition to being relatively costly, the use of elongate, metal coil springs as torsion springs in exercise apparatus for biasing lever mechanism in a first direction tends to be undesirable due to inadequate longevity and durability of such torsion springs.

Thus, known mechanisms for returning the foot pedals of exercise apparatus to the upper position either do not function satisfactorily or lack sufficient durability and longevity.

Elastomeric torsion springs have been used in applications unrelated to exercise apparatus as a means for opposing rotation of various mechanisms in a first direction and for biasing the mechanism so as to cause it to rotate in a second, opposite direction. Such elastomeric torsion springs typically comprise an annular outer casing made from a rigid material such as steel or aluminum, an annular central member made from an elastomeric material and attached to the inside surface of the outer casing, and an inner casing which is also typically made from a rigid material such as steel or aluminum and is attached to the inner surface of the central member. In use, the inner casing is typically fixed to a first member and the outer casing is attached to a second member which is designed to pivot relative to the first member. As the second member is caused to rotate in a first direction relative to the first member, rotational force is applied to the central elastomeric member via the outer casing attached to the second member. Such rotation of the central member causes energy to be stored therein. When the second member is released, the energy stored in the elastomeric central member is transmitted via the outer casing to the second member so as to cause the latter to rotate in an opposite direction relative to the first member. One such elastomeric torsion spring is distributed by B. F. Goodrich Company of Akron, Ohio, under the federally registered trademark TORSILASTIC.

Exercise devices for simulating walking or climbing that include additional levers to be worked by a user's hands to exercise the upper body concurrently with the lower body are also known in the art. One such "full body" exerciser is disclosed by U.S. Pat. No. 4,934,690. The exerciser includes two foot beams pivotally secured to a frame. A hydraulic cylinder is connected from the frame to one of the foot beams, and a rocker arm assembly pivotally mounted to the frame below the foot beams links the foot beams together for opposing up and down motion. The exercise device further includes two hand levers rotatably mounted to the frame above the foot beams. Each hand lever is mounted to the first end of a pivot lever pivotally mounted to the frame. A tie rod connected from the second, opposite end of the pivot lever to a foot beam links the movement of the foot beams and hand levers. Depression of a particular foot beam results in the corresponding arm lever rotating away from the user in the opposite direction. Because of the linkage, a user acts on both foot beams as well as both arm levers to overcome the resistance of the hydraulic cylinder. However, in so doing the user is forced to coordinate the movement of all four of his or her limbs. This coordination may be difficult for many individuals. Further, an individual is not able to concentrate his or her efforts on the upper or lower body, as may be desired, but is forced to exercise upper and lower muscle groups affected equally.

BRIEF SUMMARY OF THE INVENTION

The present invention is an exercise apparatus comprising a frame, first and second foot beams, and mounting means for pivotally mounting the foot beams to the frame. The mounting means comprise a pair of elastomeric torsion springs for resisting movement of the foot beams in a downward direction and for urging the foot beams in an upward direction. Use of elastomeric torsion springs for providing such resistive and restorative forces to the foot beams is highly advantageous from the standpoint of durability, longevity, and cost.

In an alternate embodiment, the exercise apparatus further includes two hand levers pivotally secured to the frame. Each hand lever is linked by a tie rod to a corresponding foot beam, resulting in rotation of a hand lever away from the user when the tied foot beam is depressed downwardly in the opposite rotational direction. The elastomeric torsion springs are used to mount each foot beam to the frame and act to both urge the foot beam upwardly and the corresponding hand lever inwardly towards the user.

In a further alternate embodiment, the exercise apparatus includes hand levers that are mounted to the frame for operation independent of the foot beams. Each hand lever is rotatably mounted by an elastomeric torsion spring to a shaft projecting from the frame. The torsion springs serve to both offer working resistance to movement of the arm levers, from a nominal to a displaced position and to urge the arm levers back to their nominal positions.

In an additional alternate embodiment, the exercise apparatus includes two mounting members that are rotatably secured to the frame and linked by tie rods to corresponding foot beams. The mounting members rotate about a first axis with depression of the corresponding foot beams. A hand lever is mounted to each mounting member by an elastomeric torsion spring so that the hand lever is rotatable about a second axis. Normally, the mounting member and hand lever rotate as an assembly about the first axis unless differential resistance is exerted against the hand lever relative to the foot lever to rotate the hand lever about the second axis.

A further alternate embodiment of an exercise apparatus constructed in accordance with the present invention includes a frame and at least first and second levers rotatably mounted to the frame to rotate about first and second axes, respectively. The exercise apparatus includes a linkage, such as a resilient linkage, coupling the first lever to the second lever so that as the first lever rotates about the first axis the second lever is normally caused to rotate a related distance about the second axis.

The linkage also enables discontinuity between the rotation of the first and second levers when a user exerts a differential force on the second lever relative to the first lever. The resilient linkage can include an elastomeric joint member that reversibly deforms in response to differential force exerted on the second lever relative to the first lever.

In a still further alternate embodiment, the exercise apparatus includes two hand levers that are secured to the foot levers. Each hand lever moves together with its corresponding foot lever as the foot lever is rotated.

BRIEF DESCRIPTION OF THE DRAWINGS

FIG. 2 is an exploded perspective view of a portion of the apparatus shown in FIG. 1, including the elastomeric torsion springs used for pivotally mounting the foot beams to the support frame;

FIG. 3 is a side elevation view of the elastomeric torsion springs shown in FIG. 2;

FIG. 4 is a pictorial view of a full body exerciser including elastomeric torsion springs for pivotal mounting of the foot beams to the support frame;

FIG. 5 is a side elevation view of the exercise apparatus shown in FIG. 4;

FIG. 6 is a pictorial view of a full body exercise apparatus having arm levers mounted on elastomeric torsion springs to the frame for operation independent of the foot beams;

FIG. 7 is a side elevation view of the exercise apparatus shown in FIG. 6;

FIG. 11 is a pictorial view of an alternate full body exerciser having arm levers that are rigidly secured to the foot beams;

FIG. 12 is a side elevation view of the exercise apparatus of FIG. 11;

FIG. 13 is a pictorial view of an alternate embodiment of a full body exercise apparatus including resilient linkages coupling the hand levers to the foot levers;

FIG. 14 is a side elevation view of the exercise apparatus of FIG. 13;

FIG. 15 is a partial pictorial view of the exercise apparatus of FIG. 13 showing one of the resilient linkages;

FIG. 16 is a partial pictorial view of the exercise apparatus of FIG. 13 with an alternate resilient serpentine linkage;

DETAILED DESCRIPTION OF THE PREFERRED EMBODIMENT

Figure 1:
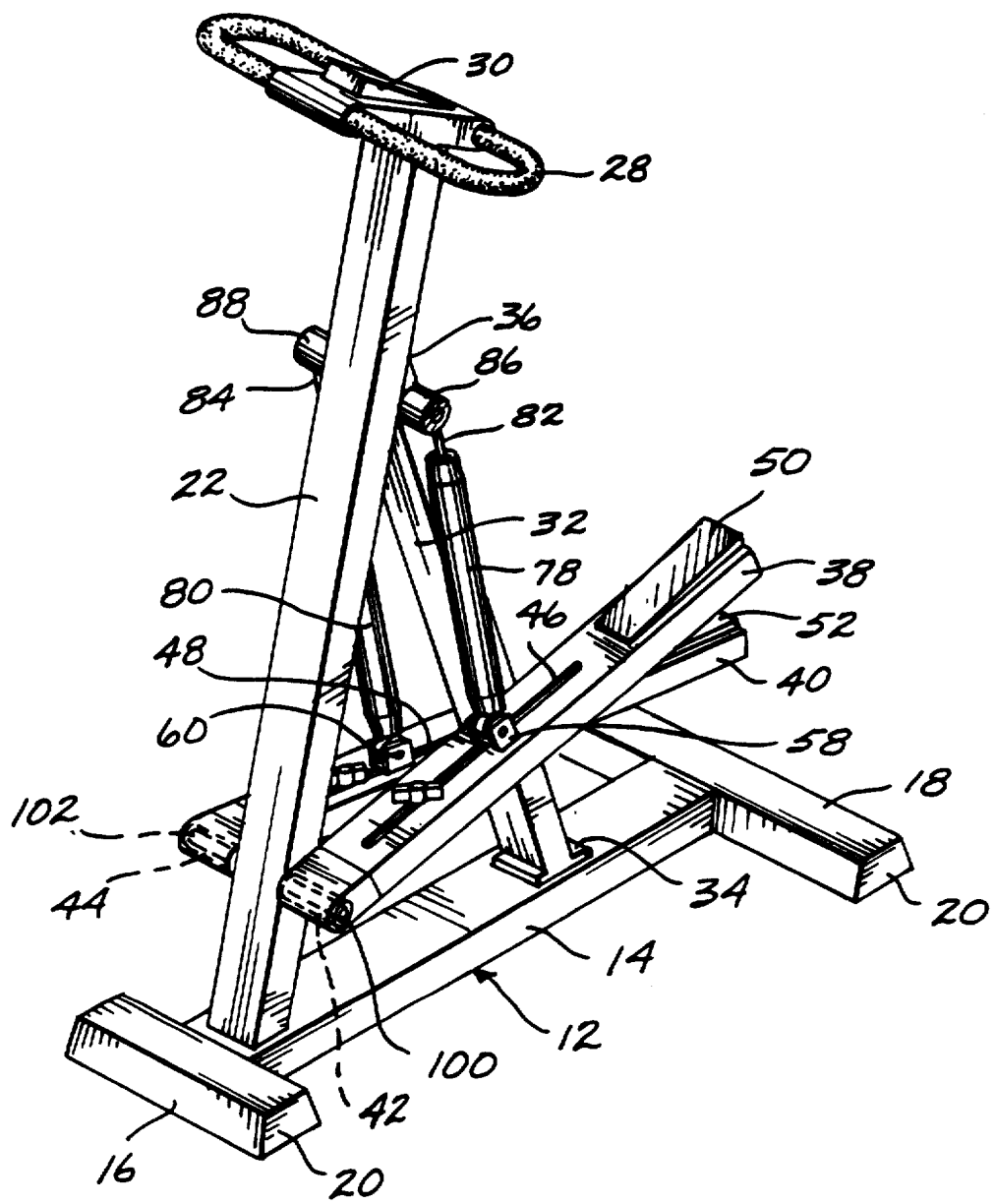
FIG. 1 is a perspective view of the exercise apparatus of the present invention.

Referring initially to FIGS. 1 and 2, a first preferred embodiment of the low impact exercise equipment 10 of the present invention is disclosed. As illustrated, the equipment 10 includes a base 12 having a longitudinally extending central beam member 14 with a pair of transverse members 16 and 18 mounted at its opposite ends. It will be understood that the particular shape of the base member is not critical to the present invention, it being required only that the base provide a surface for mounting the upwardly extending members to be described hereafter, as well as providing a sufficiently long and wide footprint to prevent the equipment from tipping during use. For instance, an adequate base could be formed from a longitudinal member having but a single lateral member mounted at its rear portion below the user's feet, as long as the lateral member is sufficiently long to prevent the unit from tipping sideways during use. The laterally extending member could extend normal to the longitudinal member or at an angle thereto and could be straight or curved. Other base configurations including a box, a plate, or an A-frame having one or more transverse beams extending between diverging longitudinally extending beams could also be used.

In the preferred embodiment illustrated, the support frame is formed of tubular metallic material, and end plugs or caps 20 are provided to close the ends of the tubular sections. Tubular members of other material composition or differing configurations could also be satisfactorily used.

As illustrated in FIGS. 1 and 2, a first upwardly extending beam member 22 is shown mounted on beam member 14, immediately rearward of forward transverse base beam 16. As illustrated, beam member 22 includes a foot pad 24 fixed thereto by welding or the like, which pad includes a pair of openings positioned above cooperating slots or openings in beam member 14, in which conventional fasteners are positioned to hold beam member 22 to longitudinal beam member 14. Upwardly extending beam member 22 may be connected to the beam member 14 by any other conventional means including welding.

As illustrated, beam member 22 extends to a point upwardly and rearwardly from its mounting point on beam member 14 and includes a handgrip member 28 at its upper end. Handgrip member 28 includes a pair of laterally extending loops, portions of which are adapted to be gripped by the user during exercise. Alternatively, any conventional handgrip, including a bicycle-type handlebar, may be satisfactorily used. An electronic package 30 including a readout screen is shown positioned in the central portion of handgrip member 28 where it can be readily viewed by the user of the equipment. Electronic readouts, in general, are known on exercise equipment, and such readout is not considered to be a novel portion of the present invention.

Also extending upwardly from longitudinal beam member 14 from a point rearward of the mounting point of the first upwardly extending member 22 is a second structural member 32. Member 32 extends from a baseplate 34 to intersect beam member 22 at a point 36 between its upper and lower ends. From a structural point of view, member 32 acts as a buttress to support upwardly extending beam member 22. It has been found that the disclosed arrangement of a stable base, a first member extending to a point upwardly and rearwardly of its base connection, and a buttress member extending to a point upwardly and forwardly from its mounting point on the base beam to interconnect with the main beam between its ends, forms a highly advantageous frame structure for the presently described equipment which provides not only strength and durability, but also functions in an efficient manner to support the movable elements of the exercise equipment to be described hereafter.

It will be understood that while upwardly extending members 22 and 32 are illustrated in the drawings as straight, beam member 22 may be curved rearwardly along its length either immediately from footpad 24 or from a point along its length after extending a distance upwardly. Similarly, member 32 may extend upwardly from the base for distance and then curve at any desired angle to interconnect with beam member 22 between its ends. The specific shape of the beams is not critical as long as they accomplish the functions described herein.

The interconnection between members 32 and 22 is preferably made by bolting through a cushioning gasket, disposed therebetween (not shown), but it will be understood that the pieces may be welded together or otherwise fastened together in any conventionally known manner.

Referring again to FIGS. 1 and 2, foot beams 38 and 40 are shown pivotally mounted on support arms 42 and 44, as described in greater detail below. Arms 42 and 44 are attached to and cantilever outwardly from the lower end of beam member 22 in directions opposite one another and extending perpendicular to the longitudinal axis of beam member 22. As shown, foot beams 38 and 40 are formed of a hollow tubular construction and include longitudinally extending slots 46 and 48 in their top surface. These slots are adapted to receive means for mounting one end of the resistance means to be described hereafter. The beams also include nonskid foot pads 50 and 52 mounted on their upper surface distal from their pivotal connection to support arms 42 and 44. The foot pads generally locate the area upon which a user stands when exercising with the presently disclosed apparatus. Cushioning pads (not shown) are mounted beneath the beams near the ends to cushion contact of the ends of the beams with laterally extending transverse member 18 when the foot beams are pivoted downwardly into contact therewith, either during use of the equipment or when a user dismounts.

Shock absorber mounting bracket assemblies 58 and 60 are shown slidably mounted in slots 46 and 48 of the foot beams. Bracket assemblies 58 and 60 are designed to couple the lower ends of shock absorbers 78 and 80, respectively, with foot beams 38 and 40. Ideally, bracket assemblies 58 and 60 are identical to the bracket assemblies used to mount the shock absorbers of the exercise apparatus disclosed in U.S. Pat. No. 4,838,543 to the foot pedals of the presently disclosed apparatus. For a more detailed description of bracket assemblies 58 and 60, attention is directed to U.S. Pat. No. 4,838,543 which is incorporated herein by reference.

As noted above, the equipment 10 includes linearly operable resistance means such as shock absorbers 78 and 80. The lower ends of the shock absorbers extend between the bracket assemblies 58 and 60 mounted to the foot beams and a mounting point on the support frame thereabove. The upper ends of piston rods 82 and 84 of shock absorbers 78 and 80, respectively, are attached via bracket assemblies 86 and 88 to upwardly extending beam member 22. Again, reference should be made to U.S. Pat. No. 4,838,543 for a more detailed description of the interconnection of shock absorbers 78 and 80 with foot beams 38 and 40 and the beam member 22.

Referring to FIGS. 1-3, equipment 10 includes elastomeric torsion springs 100 and 102 for pivotally mounting foot beams 38 and 40 on support arms 42 and 44 which, as noted above, are shown as attached near the lower end of upwardly extending beam member 22. Ideally, the elastomeric torsion springs 100 and 102 are identical to one another, and as described with respect to spring 100 illustrated in FIGS. 2 and 3, include a hollow, essentially cylindrical outer casing 104 having diametrically opposed, radially projecting keys 106 extending along the casing. Torsion spring 100 additionally includes an annular elastomeric member 110, which is securely bonded or otherwise securely attached to the inner surface of outer casing 104. Elastomeric member 110 includes a central bore 112, which has a predetermined, e.g., hexagonal, cross-sectional configuration. Spring 100 further comprises a hollow, cylindrical inner casing 114 having a size and cross-sectional configuration corresponding to that of bore 112 in elastomeric member 110. Inner casing 114 is bonded or otherwise securely attached to the side walls of bore 112. Preferably, outer casing 104 and inner casing 114 are made from a rigid, high-strength material such as steel or aluminum. The specific composition of elastomeric member 110 will vary depending upon the desired resistive and restorative forces to be applied by the torsion springs 100 and 102 to foot beams 38 and 40, as described in greater detail hereinafter. However, a synthetic rubber compound is typically used for elastomeric member 110.

Support arms 42 and 44 and foot beams 38 and 40 are designed to be readily coupleable with torsion springs 100 and 102, respectively. In this connection, ideally the diametric size and cross-sectional configuration of support arms 42 and 44 closely correspond to the internal diametric size and cross-sectional configuration of inner casing 114 of torsion springs 100 and 102. More specifically, support arms 42 and 44 are sized and configured so that torsion springs 100 and 102, respectively, may be snugly fit onto the support arms by inserting the support arms into the inner casings 114 of the torsion springs.

To facilitate attachment of foot beams 38 and 40 to torsion springs 100 and 102, respectively, the foot beams each include a keyed bore 120 adjacent the front ends (i.e., the ends pivotally mounted to upwardly extending beam member 22) of the foot beams. The size and cross-sectional configuration of bores 120 correspond to the exterior size and configuration of outer casing 104, whereby the foot beams may be pressed or snugly fit onto an associated torsion spring by inserting the torsion spring into the bore 120 of the associated foot beam. In this regard, a pair of diametrically opposed key ways 122 are broached or otherwise formed lengthwise of the bores 120. As will be appreciated, the mating engagement of the keys 106 with the key ways 122 prevents relative rotational movement between the outer casing 104 and associated first keyed bore 120. It is to be understood that the outer casing 104 and the keyed bore 120 may be of other configurations without departing from the spirit or scope of the present invention.

Although torsion springs 100 and 102 are typically secured to the respective support arms 42 and 44 and foot beams 38 and 40 by a press or snugly fit engagement, it may be desirable to employ additional means for preventing relative axial movement of the torsion springs and foot beams. For instance, a large washer and screw (not shown) may be attached to the support arms, with the washer engaging the outer surface of the foot beams adjacent the bores 120 thereof and the screw being received in a threaded bore in the support arms.

In operation, it will be understood that the downward movement of a foot beam by a user placing his or her weight thereon will be resisted by the associated shock absorber 78 or 80, thus requiring the user to do work to overcome the resistive force applied by the shock absorber. As a foot beam is urged downwardly by the user, the foot beam causes the outer casing 104 of the associated torsion spring to rotate about its central axis due to the keyed engagement of the outer casing with the bore 120 of the foot beam. This rotation of outer casing 104 is transmitted to elastomeric member 110 inasmuch as the elastomeric member is securely attached to the inner surface of the outer casing. However, because the elastomeric member 110 is also attached to inner casing 114, which is prevented from rotating by its fixed engagement with an associated one of the support arms 42 or 44, torque is stored in elastomeric member 110.

In the preferred embodiments of the present invention, the material for elastomeric member 110 is selected so that outer casing 104 may be rotated up to about 45° relative to inner casing 114. Furthermore, the material used for elastomeric member 110 is selected so that the torque stored in elastomeric member 110 increases substantially linearly with increases in angular rotation of outer casing 104 relative to inner casing 114. This torque stored by elastomeric member 110 must, of course, be sufficient to overcome: (a) the weight of foot beams 38 and 40, and (b) the bias applied by the associated shock absorber 78 or 80 to restore the unweighted foot beam 38 or 40 to the upper position. In addition, it is preferred that elastomeric torsion springs 100 and 102 urge foot beams 38 and 40, respectively, to the upper position at a rate of speed corresponding to the speed at which a user of equipment 10 typically raises his or her feet from the lower position to the upper position. Although this rate of speed typically varies as a function of the user's cadence (i.e., steps per minute), the return rate is fast enough to not lag behind the speed at which the exerciser raises his feet when simulating stair climbing, even at a rapid pace. In this regard, the return of the foot beams is typically about 20 degrees/second to about 90 degrees/second. Of course, due to the design of equipment 10, foot beams 38 and 40 never rotate more than about 45° in a given direction of travel. In the preferred embodiment of the invention, the composition of elastomeric member 110 is selected to generate a torque of about 1000 inch-pounds when outer casing 104 has been rotated about 45° relative to inner casing 114.

Once the user has released his or her weight from a given one of foot beams 38 or 40, the torque stored in elastomeric member 110 will urge the outer casing 104 attached to the elastomeric member in a direction opposite that in which the outer casing was caused to rotate when the foot beam was depressed. Such rotation of outer casing 104 causes the foot beam attached thereto via the keyed engagement of the outer casing with the bore 120 of the foot beam to move upwardly until all of the stored torque in the elastomeric member has been dissipated. As the foot beam is urged upwardly by the associated torsion spring, the foot beam drives the lower housing of the associated shock absorber 78 or 80 upwardly toward its attachment point to beam member 22. Thus, the restorative force applied by elastomeric member 110 must be sufficient to overcome the weight of the associated foot beam as well as any resistive force generated by the associated shock absorber.

Because elastomeric torsion springs 100 and 102 are relatively mechanically uncomplicated in design, and because the torsion springs are made from extremely durable materials, the elastomeric torsion springs have exceptional longevity. As such, an exercise apparatus equipped with torsion springs 100 and 102 as the means for restoring the foot beams to the upper position will tend to operate for a much greater period of time without malfunction than exercise apparatus using other means for restoring the foot beams to the upper position.

It should be appreciated that springs 100 and 102 may be used on other types of exercise apparatus designed to simulate walking or climbing. One such example is a full body exercise apparatus 130 illustrated in FIGS. 4 and 5. The full body exercise apparatus 130 is similar to exercise equipment 10, but includes a pair of hand levers 132 and 134 coupled by linkage tie rods 136 to foot levers, denoted as foot beams 38' and 40'. Many of the parts of the full body exercise apparatus 130 are identical in construction to corresponding parts of the exercise equipment 10, and are numbered using the same reference numerals with the addition of a prime designation ('). For instance, foot beams 38' and 40' in the full body exercise apparatus 130 are constructed identically to foot beams 38 and 40 in the exercise equipment 10.

The exercise apparatus 130 includes a frame 138 having a base 12' formed from a central beam member 14' capped by forward and rearward transverse members 16' and 18', respectively. As used in this application, forward refers to the direction that a user faces when he or she stands on the foot beams 38' and 40' and grasps the hand levers 132 and 134, with rearward referring to the reverse direction. The frame further includes an upright post member 140 that is bolted or otherwise secured to the central beam member 14' in proximity to the forward transverse member 16'. The upright post member 140 projects upwardly and slightly forwardly from its point of attachment to the central beam member 14'.

Referring to FIG. 5, the forward ends of the foot beams 38' and 40' are mounted to either side of a transverse lower shaft 142. The transverse lower shaft 142 is mounted transversely to a forward face 144 of the upright post member 140. The transverse lower shaft 142 is spaced forwardly away from the forward face 144 of the upright post member 140 by a standoff bracket (not shown). The standoff bracket is welded or bolted to both the forward face 144 and the center of the transverse lower shaft 142.

The foot beams 38' and 40' are mounted to the transverse lower shaft 142 by elastomeric torsion springs 100' and 102', respectively. Elastomeric torsion springs 100' and 102' are constructed, mounted, and operate in the same fashion as described in the previous preferred embodiment.

The exercise apparatus 130 further includes linearly operable resistance mechanisms, such as the two shock absorbers 78' and 80' illustrated in FIGS. 4 and 5. The lower ends of the shock absorbers 78' and 80' are pivotally mounted to the foot beams 38' and 40', respectively, rearwardly of the transverse lower shaft 142 by shock absorber mounting bracket assemblies 58' and 60'. Again, attention is directed to U.S. Pat. No. 4,838,543 for a full description of the construction of bracket assemblies 58' and 60'. Each shock absorber 78' and 80' includes an upper piston rod end 146 that is pivotally secured to the upright post member 140 on a transverse upper shaft 148, as shall subsequently be described.

Referring specifically to FIG. 4, the upper shaft 148 is positioned transversely on the upright post member 140, at a location spaced upwardly from and parallel to the transverse lower shaft 142. In the preferred embodiment shown, the transverse upper shaft 148 is received within a bore (not shown) formed transversely through the upper end portion of the upright post member 140. The upper shaft 148 is secured in place by welding or another conventional method, and projects outwardly from both sides of the upright post member 140. It should be readily apparent that in place of a single shaft 148, two outwardly projecting stub shafts could be utilized.

Each hand lever and corresponding shock absorber is attached to one end of the transverse upper shaft 148 in corresponding fashion. Accordingly, only the mounting of the hand lever 132 and shock absorber 78' are described. Referring again to FIG. 4, a hollow cylindrical spacer 150 is received over the projecting end of the upper shaft 148. A bracket housing 152 is rotatably mounted on the outermost end of the transverse upper shaft 148, spaced away from the upright post member 140 by the spacer 150. The lower end of the hand lever 132 is securely received within an upper portion 154 of the bracket housing 152. The upper extremity of the piston rod end 146 of the shock absorber 78' terminates in an eye loop (not shown) that is received over the transverse upper shaft 148 within the bracket housing 152.

An end cap 166 is bolted to the exposed end of the transverse upper shaft 148 to secure the bracket housing 152 in place. The bracket housing 152 and attached hand lever 132 are able to rotate on the transverse upper shaft 148 independently of the upper extremity of the shock absorber 78'. As an alternative to this configuration, the upper extremity of the shock absorbers 78' and 80' may be mounted on separate stub shafts at a point on the frame 138 below the transverse upper shaft 148, the apparatus still functioning in accordance with the present invention.

Referring to FIG. 5, the bracket housing 152 further includes a forwardly projecting flange portion 168. The tie rod 136 has an upper end that is pinned or otherwise pivotally secured to a forward tie of the flange portion 168. The lower end of the tie rod 136 is pinned to a connection flange 170 projecting upwardly from the foot beam 38' at a point located between the shock absorber mounting bracket assembly 58' and the transverse lower shaft 142. Due to this linkage, the hand lever 132 rotates forwardly, away from the user, about the transverse upper shaft 148 when the foot beam 38' rotates downwardly in the opposite direction about the transverse lower shaft 142. Correspondingly, when the foot beam 38' rotates upwardly, the hand lever 132 rotates rearwardly in the opposite direction.

Referring still to FIG. 5, in operation a user places his or her feet on the foot beams 38' and 40' and grasps the hand levers 132 and 134 with his or her hands. Linked hand lever 132 and foot beam 38' are movable independently of linked hand lever 134 and foot beam 40'. Each coupled foot beam and hand lever have nominal positions in which they are disposed unless acted on by the user. Hand lever 132 and foot beam 38' are illustrated in this nominal position in FIG. 5. To use the apparatus, the user bears his or her weight down on a foot beam while pushing the corresponding hand lever away in the forward direction. As a result, the foot beam and hand lever are moved to a displaced position, in which hand lever 134 and foot beam 40' are illustrated in FIG. 5. Movement of a coupled foot beam and hand lever from the nominal position is resisted by lengthening of the corresponding shock absorber. Movement from the nominal position is also resisted in part by the corresponding elastomeric torsion spring, which is deformed to store energy as described in the previous preferred embodiment. Once a first coupled hand lever and foot beam are moved to a desired displaced position, the user shifts his or her weight to the other coupled foot beam and hand lever, allowing the first set to return to their nominal positions under the urging of the elastomeric torsion spring, which releases its stored energy.

As noted previously, conventional elastomeric torsion springs are available to impart a variety of resistances, depending on the size and formulation of the elastomeric member. Ideally, the elastomeric torsion spring is constructed to provide substantially linear resistance to movement of a foot beam and corresponding hand lever from the nominal position.

By using the full body exercise apparatus 130 in the manner described, alternatively working both sides of his or her body, the user's upper and lower body muscle groups are both exercised. The full body exercise apparatus 130 may preferably also includes an electronic package 30' to monitor the user's progress.

Reference is now had to FIGS. 4 and 5 to describe the shape and function of the hand levers 132 and 134. Hand levers 132 and 134 are constructed as mirror images of each other, thus only hand lever 132 is described. Referring to FIG. 5, hand lever 132 has a rearwardly bent, upwardly projecting lever portion 172. The upper end of hand lever portion 172 terminates in a U-shaped handgrip portion 174. The U-shaped handgrip portion 174 is configured so as to open towards the vertical centerline of the exercise apparatus 130. This configuration of the hand levers 132 and 134 permits users of various physiques to comfortably use the exercise apparatus 30. A tall user may grasp the uppermost side of the U-shaped handgrip portion 174, while a shorter user may grasp the center or bottommost side of the handgrip portion 174, or even the lever portion 172. Additionally, the further radially outwardly that a user grasps the hand levers 132 and 134 from the transverse upper shaft 148, the greater the user's arm can be extended during exercise, and the greater the leverage that is gained to work against the resistance of the shock absorbers.

Figure 8:
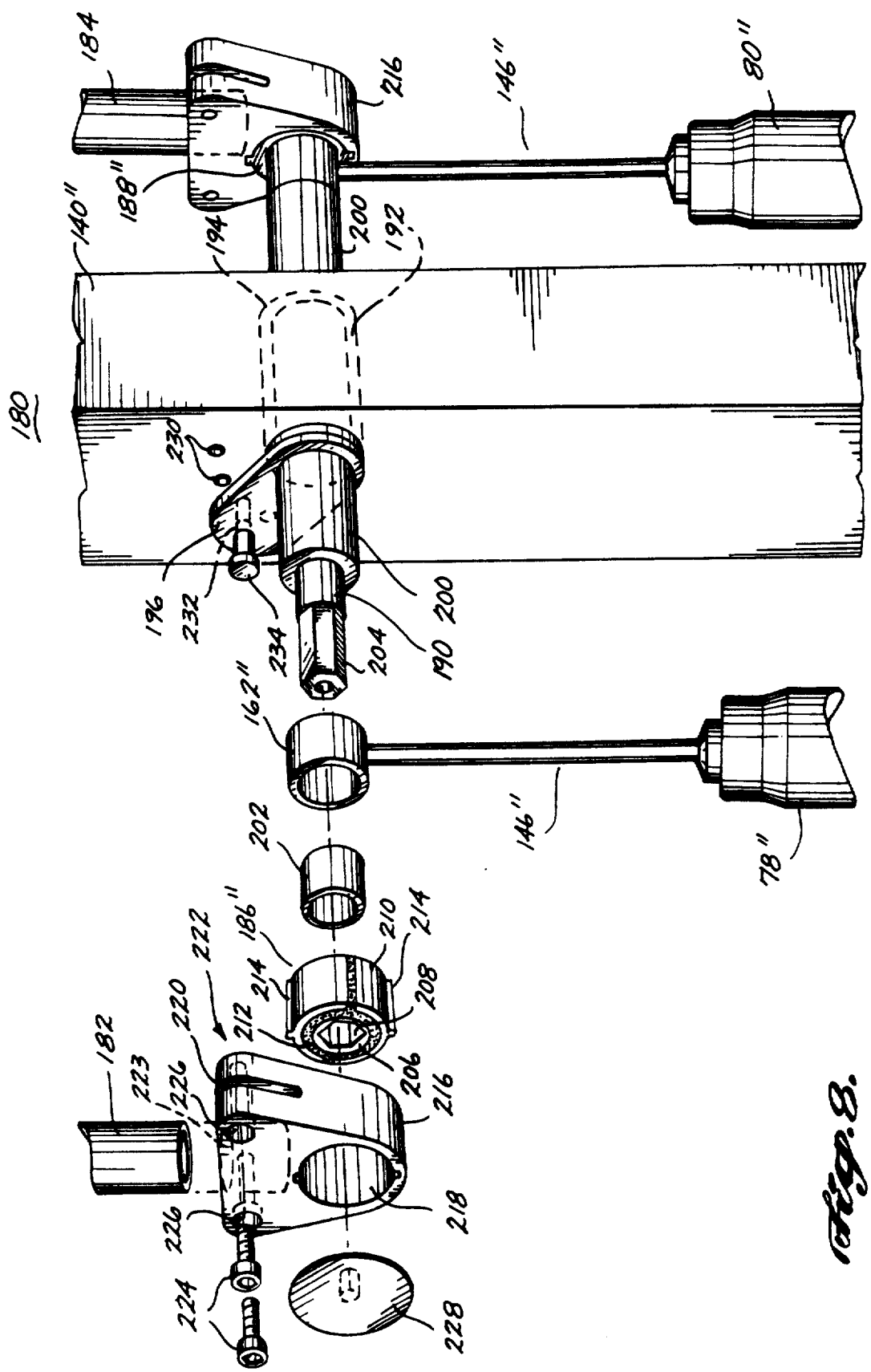
FIG. 8 is an enlarged, partial exploded view of the hand lever mounting assembly shown in the exercise apparatus of FIG. 7.

FIGS. 6 through 8 illustrate a further preferred embodiment of a full body exercise apparatus 180. The exercise apparatus 180 is somewhat similar in construction to the exercise apparatus 130 illustrated in FIGS. 4 and 5, but includes hand levers 182 and 184 that act independently of two foot levers, denoted as foot beams 38" and 40". The components of the exercise apparatus 180 that correspond to those of the exercise apparatus 130 are indicated using the same numeral denoted with a double prime (").

As illustrated in FIGS. 6 and 7, there is no tie rod linkage or other operative mechanical linkage between the hand levers 182 and 184 and their corresponding foot beams 38" and 40". Rather, the hand levers 182 and 184 are pivotally mounted to the upright post member 140" of the frame 138" by elastomeric torsion springs 186 and 188. Further reference is had to FIG. 8 for the preferred manner of mounting the hand levers 182 and 184. A transverse upper shaft 190 is rotatably mounted within a bushing 192 received within a passageway 194 formed transversely through the upper end of the upright post member 140". It should be apparent that the transverse upper shaft 190 may alternatively be mounted within a bearing, rather than a bushing 192, to enable the transverse upper shaft 190 to selectively rotate with respect to the upright post member 140".

The ends of the transverse upper shaft 190 protrude from the passageway 194 on either side of the upright post member 140". A flat adjustment plate 196 is welded or otherwise secured axially on one protruding end of the transverse upper shaft 190, illustrated as the end to which the hand lever 182 is mounted. The adjustment plate 196 is selectively engageable with the upright post member 140" to prevent rotation of the transverse upper shaft 190 from a selected radial position, as shall be described subsequently.

Except as noted above, the mounting of the hand levers 182 and 184 mirror each other, thus only the mounting of the hand lever 182 is described. The projecting end of the transverse upper shaft 190 receives a hollow cylindrical spacer 200. The spacer 200 functions to spread the hand lever 182 a desired distance from the post member 140". A low friction shock absorber mounting bushing 202 is next inserted over the end of the transverse upper shaft 190. An upper eye loop 162" of the upper free end of the piston rod 146" of the shock absorber 78" is mounted over the bushing 202 on the transverse upper shaft 190. Mounting of the shock absorber eye loop 162" on the bushing 202 allows the shock absorber 78" to pivot about the transverse upper shaft 190 independently of the hand lever 182. It should be readily apparent that rather than mounting the upper ends of the shock absorbers to the transverse upper shaft 190, they could instead be mounted to stub shafts extending laterally from either side of the upright post member 140".

The projecting ends of the transverse upper shaft 190 terminate in hexagonal key portions 204 for mounting of the hand levers. Elastomeric torsion springs 186" and 188" are non-rotatably mounted on the hexagonal key portions 204 of the transverse upper shaft 190. The elastomeric torsion springs 186" and 188" are constructed and function in the same fashion as those described previously for mounting foot beams on exercise apparatus.

Still referring primarily to FIG. 8, each elastomeric torsion spring includes a rigid annular inner shell 206. The inner shell 206 includes an inner surface 208 that is hexagonally shaped and sized to snugly and non-rotatably engage over the hexagonal key portion 204 of the transverse upper shaft 190. The elastomeric torsion spring 186" further includes a rigid annular outer shell 210 having an internal diameter that is larger than the outside diameter of the inner shell 206. An annular elastomeric member 212 is disposed between the inner shell 206 and the outer shell 210, and is joined to the cylindrical inner surface of the outer shell 210 and the cylindrical outer surface of the inner shell 206 by adhesive bonding, molding, or other appropriate method. Note that in commercially available elastomeric torsion springs, the outer shell 210 may be split along two diametrically opposed longitudinal lines to allow some compression of the annular elastomeric member 212 when installed.

The outer shell 210 includes two longitudinal keys 214. A hand lever mounting block 216 includes a transverse passageway 218 that includes corresponding key ways. The passageway 218 non-rotatably receives the keyed outer surface of the elastomeric torsion spring 186''. The compression of the elastomeric torsion spring 186'' during installation within the passageway 218 is typically sufficient to secure the mounting block 216 in place. The elastomeric torsion spring is also preferably "press fit" to the shaft 190 for retention in place.

The mounting block 216 includes a longitudinal slot 220 that bisects an upper portion 222 of the block, above and perpendicular to the transverse passageway 218. A cylindrical recess 223 is formed downwardly through the bisected upper portion 222 of the mounting block 216. The lower end of the hand lever 182 is received within the cylindrical recess 223. Two fasteners 224 are threaded into transverse bores 226 extending through the mounting block 216 to compress the bisected upper portion 222 around the lower portion of the hand lever 182 to secure it in place. A cylindrical cap 228 is mounted over the exposed end of the transverse upper shaft 190 and the elastomeric torsion spring 186'' for aesthetic purposes.

Referring to FIG. 6, when the elastomeric torsion springs 186 and 188 are relaxed, the hand levers 182 and 184 project generally forwardly in a nominal position. The full body exercise apparatus 180 includes an adjustment mechanism to selectively adjust the nominal position of the hand levers 182 and 184. Referring to FIG. 8, a series of detents 230 is formed in the side of the upright post member 140'' against which the adjustment plate 196 faces. The detents 230 are disposed radially about the transverse upper shaft 190. A spring-loaded pull pin 234 is mounted to the adjustment plate 196. The tip of the pin 234 aligns sequentially with the detents 230 as the transverse upper shaft 190 is rotated. To lock the transverse upper shaft 190 in place for a selected desired nominal hand lever position, the pull pin 234 is inserted into an aligned detent 230. To change the nominal position of the shaft 190, the pull pin 234 is pulled outwardly from the upright post member 140'', and then the transverse upper shaft 190 is rotated until the pull pin 234 is aligned with a selected detent 230, wherein the pull pin is released and snaps into position.

Referring to FIG. 7, when the elastomeric torsion springs 186 (and 188) are relaxed the hand levers 182 and 184 are disposed in alignment along a nominal position line 236. A user may push either hand lever to rotate it in a first direction away from the user to a first displaced position, in which the hand lever 184 is shown. Each hand lever may also be pulled from the nominal position to rotate them in a second direction towards the user for placement in a second rotated position, in which the hand lever 182 is shown. When rotated in either direction from the nominal position, the user must work against the resistance provided by the elastomeric torsion springs 186 and 188. As the hand levers are rotated in either the first or second directions, the elastomeric member 212 of the corresponding elastomeric torsion spring is deformed and stores energy. When the user releases the push or pull force from the hand lever, the elastomeric member 212 releases stored energy to urge the hand lever back to its nominal position.

It should be apparent that if desired a user may selectively adjust the hand levers to a nominal position in which they are inclined towards the user, so that the user will typically exert force only to push the levers away from him or herself. Similarly, the nominal position of the hand levers may be adjusted so that the hand levers project slightly forwardly away from the user, so that the user exerts force only to pull the hand levers towards him or herself.

Typically in use, a user will exercise both sides of his or her upper and lower body in the same manner as that described for the previous full body exercise apparatus 130. Generally the user will exert force against the right hand lever and foot beam, followed by the left hand lever and foot beam, and so on, in an alternating manner. The independent operation of the hand levers and foot beams allows for some discontinuity in movement between the hand levers and foot beams, so that the user can develop a cadence with the degree of evenness with which he or she is comfortable. The independent operation of each hand lever with respect to the opposing hand lever enables further flexibility in the degree of synchronization with which a user is comfortable.

As illustrated in FIGS. 6 and 7, the foot beams 38'' and 40'' are preferably rotatably mounted to the upright post member 140'' with elastomeric torsion springs 100'' and 102''. It should be readily apparent that an exercise apparatus 180 having hand levers rotatably mounted on elastomeric torsion springs may alternately be constructed with foot beams that are mounted using a foot beam return mechanism other than elastomeric torsion springs. For instance, an exercise apparatus 180 may include foot levers mounted using a rocker arm assembly (not shown) or cable and pulley return mechanism (not shown), and still be within the scope and spirit of the invention.

Figure 9:
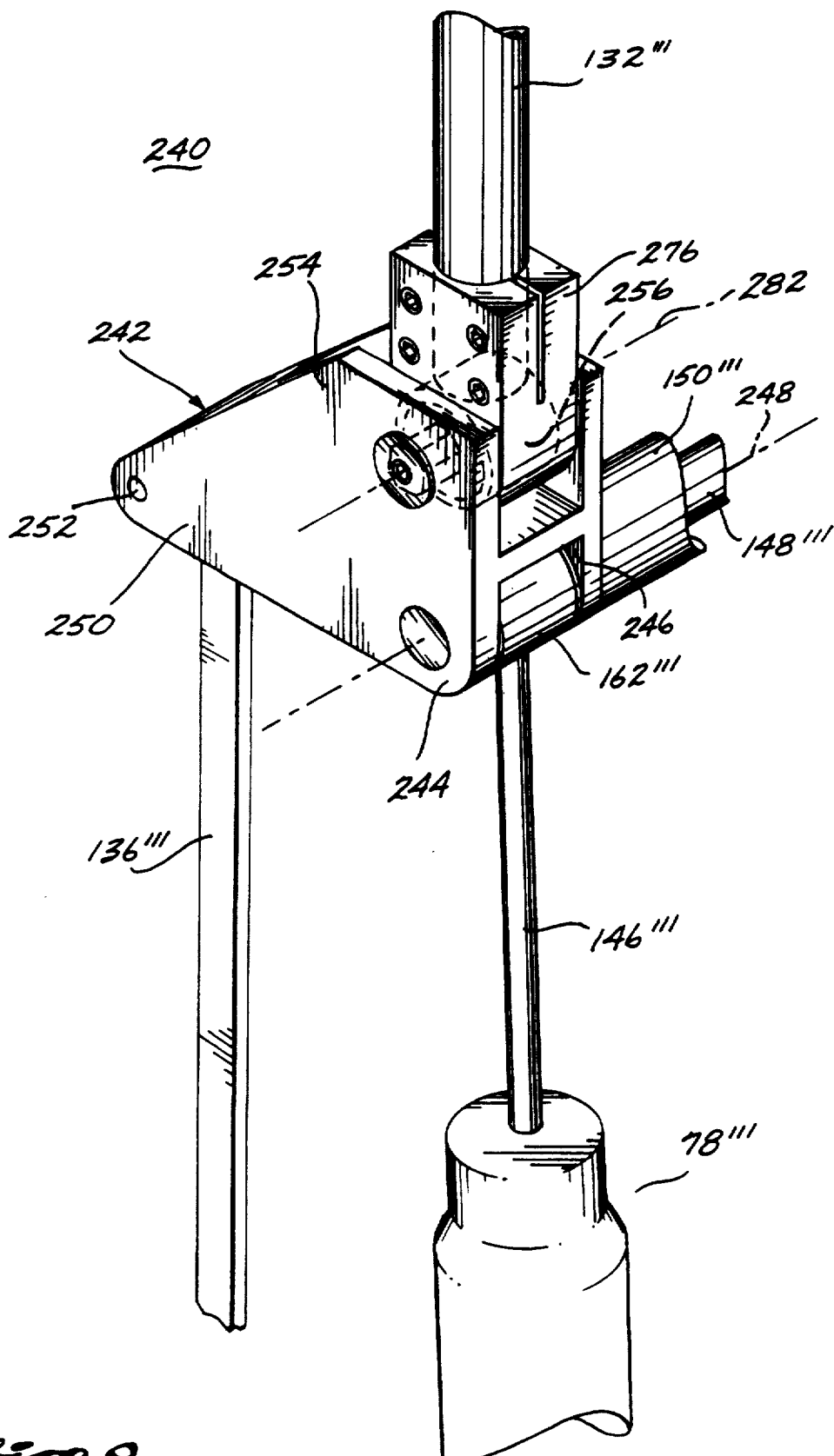
FIG. 9 is an enlarged, partial pictorial view of an alternate full body exercise apparatus having arm levers mounted on elastomeric torsion springs to a mounting member that is in turn coupled to the foot beams.
Figure 10:
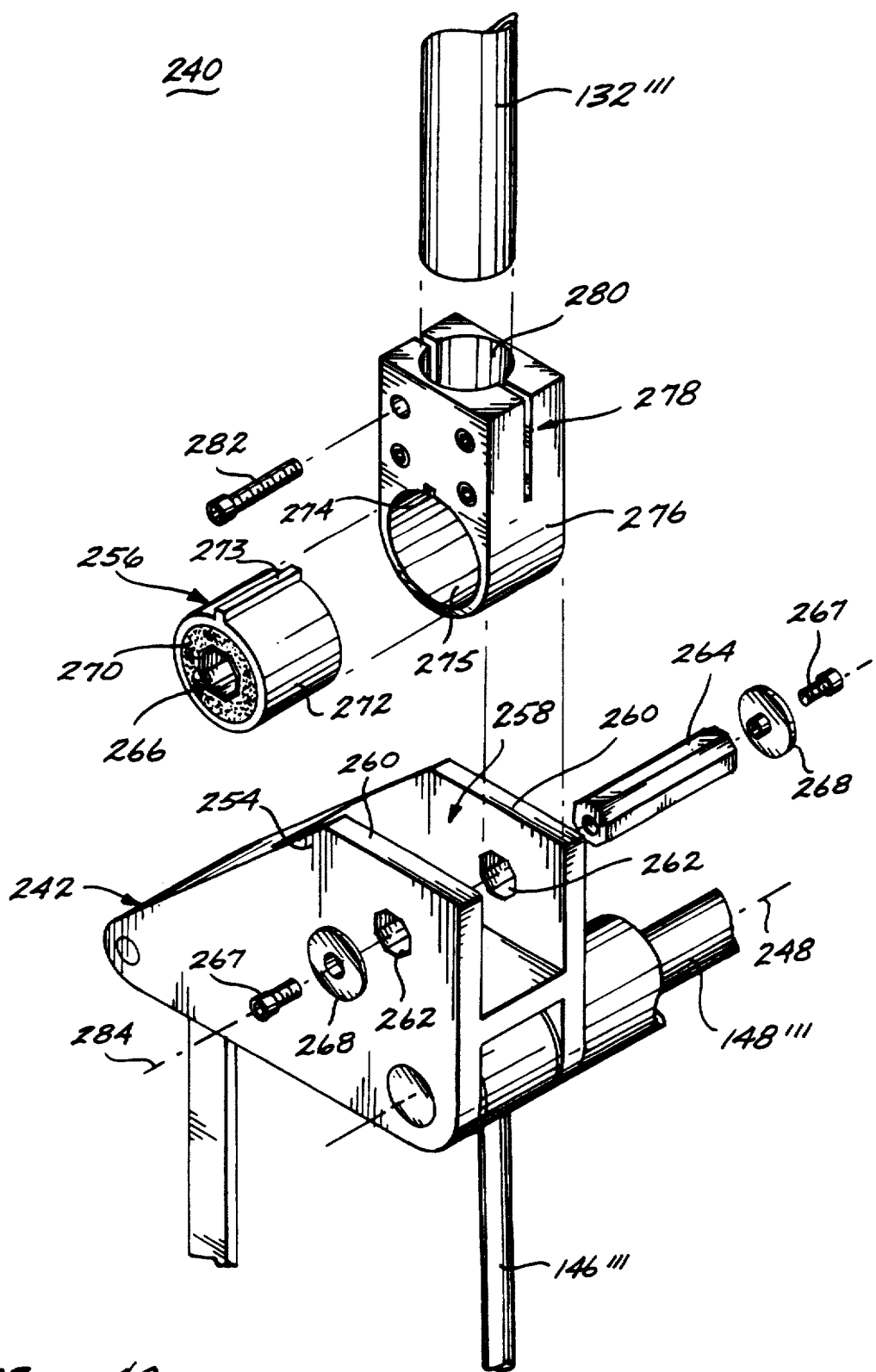
FIG. 10 is a partial exploded view of the exercise apparatus shown in FIG. 9.

A further alternative embodiment of a full body exercise apparatus constructed in accordance with the present invention is illustrated in FIGS. 9 and 10. The full body exercise apparatus 240 shown in constructed similarly to the full body exercise apparatus 130 illustrated in FIGS. 4 and 5, with the exception of the mounting of the hand levers to the exerciser. Accordingly, only the mounting of the hand levers to the exercise apparatus 240 is described and illustrated. Those parts which are constructed similarly to the parts of the previously described exerciser 130 are labeled using the same number with the addition of a triple prime (''') designation. Since the two hand levers are mounted to the exercise apparatus 240 in the same but opposing fashion, only the mounting of the hand lever 132''' is described.

Referring initially to FIG. 9, a mounting block 242 functions to rotatably mount the hand lever 132''' to the frame of the exerciser. The mounting block 242 has a lower portion 244 that is rotatably secured to an upright frame member (not shown) in the manner similar to the manner in which the mounting bracket 152 is rotatably secured to the upright frame member 140 in FIGS. 4 and 5. The lower portion 244 of the mounting block 242 includes a recess 246 which receives an eye loop 162''' mounted to the upper end of a piston rod 146''' of a shock absorber 78'''. A transverse upper shaft 148''' projects outwardly from the upright frame member and receives a spacer 150'''. The shaft 148''' is then inserted through aligned passages formed transversely through the lower portion 244 of the mounting block 242 on opposite side of the recess 246, passing through the eye loop 162''' of the shock absorber 78'''. The mounting block 242 is thus able to rotate about a longitudinal axis 248 of the transverse upper shaft 148'''.

The mounting block 242 further includes a forward portion 250. The upper end of a tie rod 136''' is pivotally secured by a pin 252 to the forward portion 250 of the mounting block 242. The lower end of the tie rod 136''' is pivotally secured to a foot beam (not shown) in the manner previously described with reference to the full body exercise apparatus 130. Preferably, the foot beam is mounted to the frame by an elastomeric torsion spring, as in the exercise apparatus 130. Alternatively, the foot beam can be mounted by another method that provides for foot beam return, such as a rocker arm assembly connecting the two foot beams (not shown). The pin 252 securing the upper end of the tie rod 136''' to the mounting block 242 is spaced forwardly from the location of pivotal attachment of the mounting block 242 to the transverse upper shaft 148'''. Thus, upward or downward movement of the foot beam and the corresponding tie rod 136''' causes the forward portion 250 of the mounting block 242 to swing about the axis 248.

The lower end of the hand lever 132''' is resiliently mounted to an upper portion 254 of the mounting block 242 by an elastomeric torsion spring 256. The elastomeric torsion spring 256 is constructed similarly to those of the previous described embodiments. Greater detail of this mounting can be seen in the exploded view of FIG. 10. A longitudinal, upwardly open slot 258 is formed in the upper portion 254 of the mounting block 242, bifurcating the upper portion 254 into two upwardly projecting flanges 260. The elastomeric torsion spring 256 is received endwise between the flanges 260. Aligned hexagonally through holes 262 are formed transversely through the flanges 260. A hexagonal shaft 264 is inserted through the holes 262 and through a hexagonal inner bore defined by the rigid inner member 266 of the elastomeric torsion spring 256. A threaded fastener 267 and washer 268 are secured to each end of the hexagonal shaft 264 to secure the shaft in place.

The elastomeric torsion spring 256 further includes an annular elastomeric member 270 that is joined to the outside surface of the inner member 266, and an annular, rigid outer member 272 that is joined to the outer surface of the elastomeric member 270. The outer member 272 includes a key 273 extending along its external surface that is receivable within a corresponding key way 274 formed along a transverse bore 275 through the lower portion of a mounting collar 276. Thus, the assembled torsilastic spring 256 and mounting collar 276 are received between the flanges 260 of the mounting block 242 on the hexagonal shaft 264. The mounting collar 276 includes a slotted upper portion 278. An upwardly opening bore 280 is formed in the slotted upper portion 278 to receive the lower end of the hand lever 132'''. Fasteners 282 are inserted through the slotted upper portion 278 of the mounting collar 276 to secure the hand lever 132''' firmly in place.

By this construction, the hand lever 132''' is assembled to the mounting block 242 and normally rotates together with the mounting block 242 about the axis 248 of the transverse upper shaft 148'''. Thus, in normal usage the hand levers move in unison with the corresponding foot beams.

However, should this degree of coordination of hand lever and foot beam movement be inappropriate for or undesired by a particular user, the elastomeric torsion springs 256 mounting the hand levers 132''' and 134''' to their corresponding mounting blocks 242 allows some discontinuity in movement. When a user grasping a hand lever exerts force against the hand lever that opposes the movement of the hand lever imparted by movement of the corresponding foot beam, the elastomeric torsion spring 256 deforms and the hand lever rotates about the axis 284 of the hexagonal shaft 264. When the differential resistance exerted on the hand lever relative to the foot beam is eliminated, the elastomeric torsion spring 256 urges the hand lever back to its nominal position for synchronized movement with the corresponding foot beam. The spring 256 accommodates differential movement of the hand levers to rotated positions both toward or away from the user.

The full body exercise apparatus 240 illustrated in FIGS. 9 and 10 utilizes elastomeric torsion springs 256 to mount the hand levers to the mounting blocks 242. However, other types of resilient devices could be used to mount the hand levers to the mounting blocks 242 in an exercise apparatus 240 constructed in accordance with the present invention. Both the use of the elastomeric torsion spring and the resilient mounting of the hand levers to the mounting blocks are novel features of this embodiment of the present invention. Thus, coil torsion springs, flat springs, or other devices could be substituted to resiliently mount the hand levers to the mounting blocks in the full body exercise apparatus 240. However, elastomeric torsion springs are preferable due to their linear characteristics and durability.

A still further alternate embodiment of a full body exercise apparatus constructed in accordance with the present invention is illustrated in FIGS. 11 and 12 at reference numeral 290. The exercise apparatus 290 illustrated is similar to the previously described exercise apparatus 130 of FIGS. 4 and 5, with the exception of the mounting of the hand levers. The exercise apparatus 290 does not include hand levers that are rotatably secured to the frame and coupled by tie rod linkages to the foot beams. Instead, the exercise apparatus 290 includes two hand levers 292 and 294 that are rigidly connected to the forward ends of corresponding foot beams 38'''' and 40''''. In this fashion the hand levers 292 and 294 are rotatably mounted to the frame 138'''' via the foot beams 38'''' and 40'''' to rotate together with the foot beams 38'''' and 40'''', respectively. The hand levers 292 and 294 are constructed and mounted similarly to each other. Accordingly, only the construction and mounting of the hand lever 292 is described.

In the illustrated embodiment of FIGS. 11 and 12, the hand lever 292 includes a lower end portion 296 that is secured by welding or other conventional means to a flanged bracket 298 projecting upwardly from the foot beam 38''''. In the illustrated embodiment the flanged bracket 298 is located on the upper surface of the foot beam 38'''' rearwardly of the point of pivotal attachment of the foot beam to the frame 138''''.

The hand lever 292 further includes an upper portion 299 that projects upwardly and slightly rearwardly from the lower portion 296. The upper portion 299 terminates in a transversely projecting hand grip 300 for grasping by a user. Due to the rigid connection of the hand levers 292 and 294 to the corresponding foot beams 38'''' and 40'''', each hand lever and foot beam set moves as an assembly. Each foot beam 38'''' and 40'''' is mounted by an elastomeric torsion spring 100'''' and 102'''', respectively to the frame 138'''', as previously described. This mounting provides for independent operation of and return of each foot beam and hand lever assembly.

Other configurations for a full body exercise apparatus in addition to that illustrated in FIGS. 9 and 10 are possible to permit limited discontinuity between movement of the hand levers and the foot levers. One such further example is the full body exercise apparatus 320 shown in FIGS. 13-15. Many features of the full body exercise apparatus 320 are similarly constructed and operated as in exercise apparatus 130 of FIGS. 4 and 5. These similar features are given the same part number as used in FIGS. 4 and 5, with the addition of the suffix "a," and are not described in detail to avoid repetition. The apparatus 320 includes a base 12a and an upright post member 140a projecting upwardly from the base. The apparatus 320 further includes two foot levers 38a and 40a that are pivotally mounted on a transverse lower shaft 142a, secured to the upright post member 140a, to rotate about a first axis 322. The foot lever 38a and 40a may be mounted on elastomeric torsion springs on the transverse lower shaft 142, as described for the apparatus 130 in FIGS. 4 and 5. However, rather than elastomeric torsion springs, alternate foot lever return mechanisms may be used, such as that shown in FIGS. 13 and 14. The foot levers 38a and 40a are free to rotate on the transverse lower shaft 142a. A rocker arm mechanism 324 is pivotally secured centrally to the upright post member 140a below the foot levers 38a and 40a. The ends of the rocker arm mechanism are coupled by tie rods 326 to the corresponding foot levers 38a and 40a. The rocker arm assembly 326 causes the foot lever 38a to pivot upwardly as the foot lever 40a pivots downwardly about the first axis 322, and vice versa.

The exercise apparatus 320 further includes two hand levers 132a and 134a mounted on bracket housings 152a to a transverse upper shaft 148a, pivotally secured to the upright post member 140a so as to rotate about a second axis 328. Shock absorbers 78a and 80a are connected between the upper transverse shaft 148a and the foot levers 38a and 40a, respectively, to provide resistance to movement of the hand and foot levers.

In place of the tie rods 136 used in the exercise apparatus 130 shown in FIGS. 4 and 5, the exercise apparatus 320, shown in FIGS. 13 and 14 includes two resilient linkage members 340 connected between each foot lever 38a and 40a and the corresponding hand lever bracket housing 152a. The resilient linkages 340 serve to couple each foot lever 38a, 40a to the corresponding hand lever 132a, 134a so that as the foot levers rotate about the first axis 322, the corresponding hand levers are normally caused to rotate a related distance about the second axis 328. However, the resilient linkages 340 also enable limited discontinuity between the rotation of the hand levers relative to the rotation of the foot levers when an exerciser exerts a differential force on a particular hand lever relative to the corresponding foot lever, as shall be described subsequently.

The resilient linkage member 340 connected between the hand lever 132a and the corresponding foot lever 38a is illustrated in the detailed view of FIG. 15. It should be understood that the resilient linkage 340 connected between the other hand lever 134a and foot lever 40a is identically constructed and connected. The resilient linkage member 340 includes a first end 342 pivotally pinned between flanges 344 projecting upwardly from the foot lever 38a at a point spaced rearwardly away from the first rotational axis 322. The upper end 346 of the resilient linkage member 340 is pivotally secured to the hand lever bracket housing 152a at a point spaced forwardly from the second rotational axis 328. The resilient linkage member 340 has an arcuate configuration, bowing substantially continuously along its length.

The linkage members 340 are constructed from a strong and generally stiff material having a limited degree of resiliency, such as spring steel. Other materials may alternately be used, such as fiber-reinforced thermosetting plastic resin. The resilient linkage member 340 is sufficiently stiff so that as the foot lever 38a rotates about the first axis 322, the hand lever 132a normally rotates a proportional distance about the second axis 328. However, if the exerciser's cadence becomes uneven and a differential force is exerted on the hand lever relative to the foot lever, the resilient linkage member 340 reversibly deforms, or flexes, to allow the hand lever to rotate a distance differing from a distance to the movement of the foot lever. Once the differential force is eliminated, the linkage member 340 returns to its non-deformed configuration.

Although the exercise apparatus 320 has been illustrated with an arcuate resilient linkage member 340, other configurations of curvilinear resilient linkage members may be used to couple the hand levers 132a and 134a to the corresponding foot levers 38a and 40a, respectively. For example, an alternate resilient linkage member 350 is illustrated in FIG. 16. The linkage member 350 has a straight, generally rigid lower portion 352 connected to the foot lever 38a, a resilient intermediate portion 354, and a second straight, generally rigid upper portion 356 connected to the bracket housing 152a of the hand lever 132a. The resilient intermediate portion 354 has a serpentine or "s-curve" configuration. The serpentine intermediate portion 354 resiliently flexes when differential forces are exerted on the hand lever 132a and foot lever 38a to cause elongation or shortening, as required, in the overall length of the linkage member 350 to accommodate differential rotational movement of the hand lever and foot lever.

Figure 17:
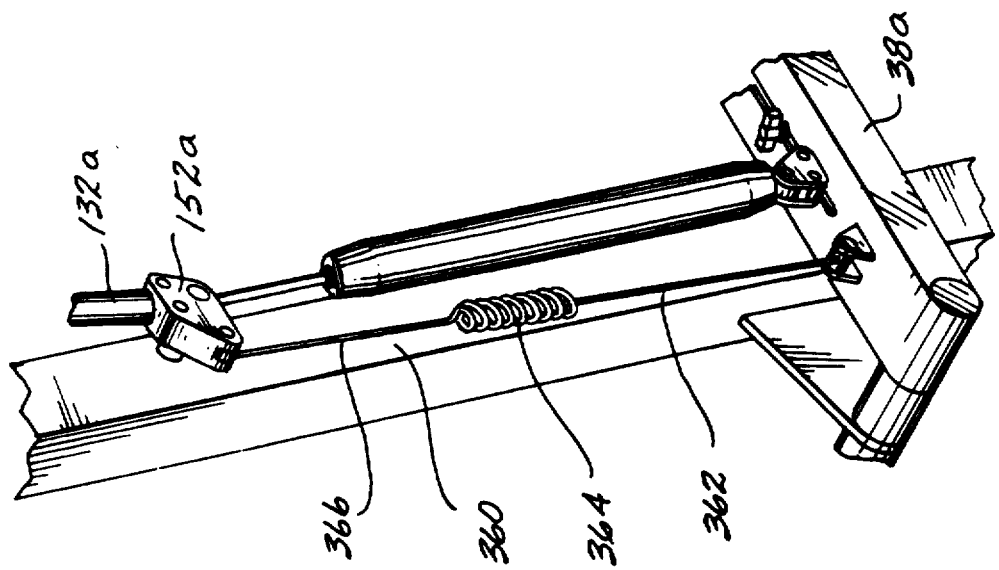
FIG. 17 is a partial pictorial view of the exercise apparatus of FIG. 13 with an alternate resilient linkage member including a coil spring.

As a further example, FIG. 17 illustrates an additional alternate configuration for a linkage member having a resilient portion. The resilient linkage 360 comprises a rod formed to define a straight lower portion 362 connected to the foot lever 38a, an intermediate wound coil spring portion 364, and a straight upper portion 366 connected to the bracket housing 152a of the hand lever 132a. The coil spring portion 364 of the linkage 360 is capable of compressing or elongating to change the overall length of the linkage 360, enabling limited discontinuity between movement of the hand lever and the foot lever.

Figure 18:
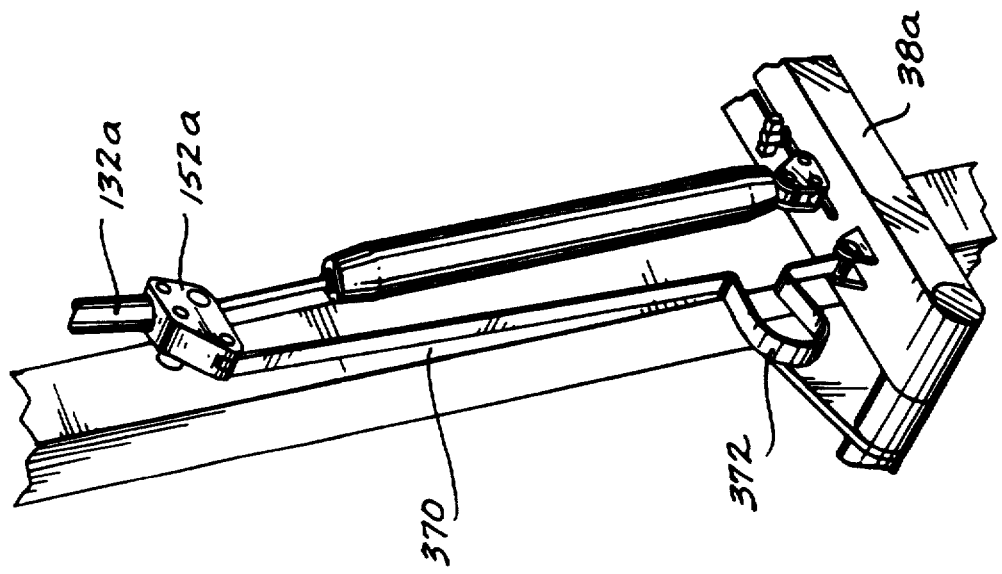
FIG. 18 is a partial pictorial view of the exercise apparatus of FIG. 13 with an alternate resilient linkage including an arcuate portion.

A still further example is illustrated in FIG. 18, which shows a resilient linkage member 370 constructed similarly to the resilient linkage member 350. However, rather than a resilient serpentine intermediate portion, the linkage member 370 includes a resiliently deformable semi-circular, or "horseshoe-shaped," portion 372.

Figure 20:
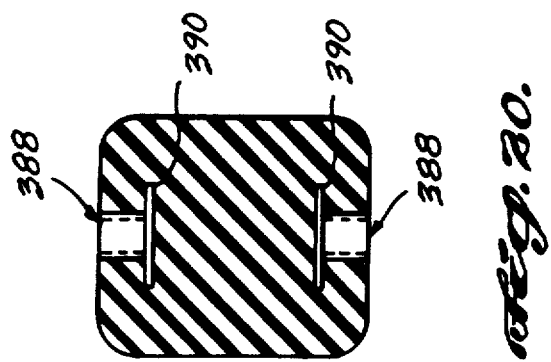
FIG. 20 is a cross-sectional view of the elastomeric joint of FIG. 19, taken substantially along the longitudinal axis of the elastomeric joint.
Figure 19:
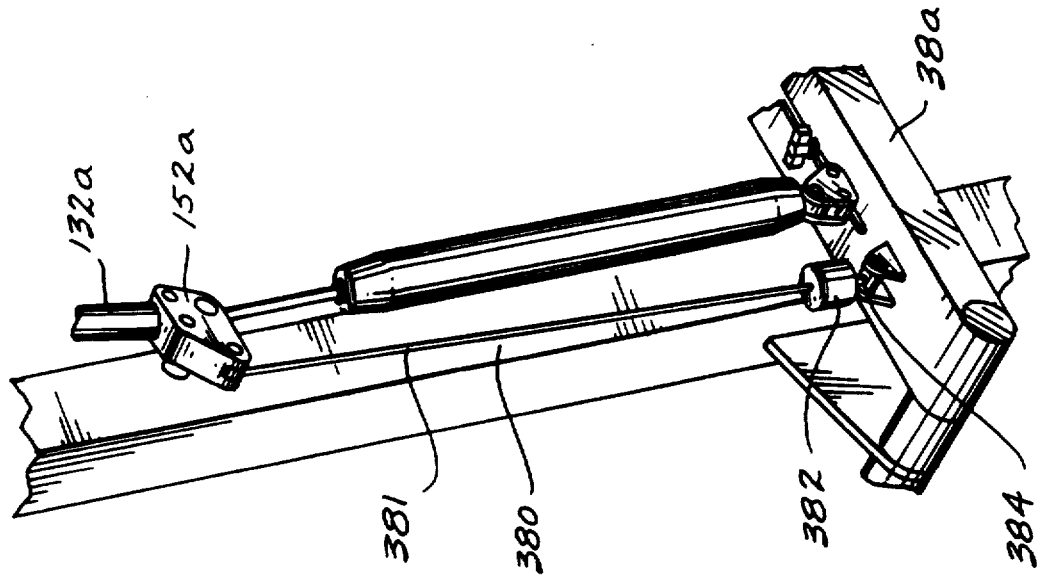
FIG. 19 is a partial pictorial view of an alternate embodiment of a full body exercise apparatus constructed similarly to that shown in FIG. 13, but including an elastomeric tie rod joint.

Another example of an alternate configuration of a resilient linkage member 380 is shown in FIGS. 19 and 20. With the exception of the linkage member 380, the exercise apparatus shown is similar in construction and operation to the previously described exercise apparatus 320 of FIGS. 13 and 14. Therefore, those features in common are not redescribed. The linkage member 380 is shown installed between one of the foot levers 38a and hand levers 132a, and includes a substantially rigid tie rod 381 and a resilient elastomeric joint 382. The tie rod 381 is pivotally attached at its upper end to the bracket housing 152a of the hand lever, and its lower end is attached to the substantially cylindrically-shaped elastomeric joint 382. First and second inserts 388 are embedded within opposite ends of the elastomeric joint 382. Each insert 388 includes a threaded bore which opens onto the corresponding end face of the elastomeric joint 382, and an inward annular flange 390 embedded within the elastomeric joint to anchor the insert 388 therein.

Referring again to FIG. 19, the lower end of the tie rod 381 is received by the upper insert 388 of the elastomeric joint 382. A coupler pin 384 is pivotally secured to the stair arm 38a and has a threaded upper end that is received by the lower insert 388 of the elastomeric joint 382. The elastomeric joint 382 is sufficiently stiff so that the length of the linkage 380 normally remains constant, enabling the hand lever 132a to rotate a proportional distance relative to the amount of rotation of the foot lever 38a. However, when a significant differential force is exerted on the hand lever 132a relative to the foot lever 38a, the elastomeric joint 382 is either compressed or elongated to enable the hand lever 132a to rotate an amount disproportionate to the rotation of the foot lever 38a. The elastomeric joint 382 reversibly deforms, returning to its original configuration upon removal of the differential force.

The elastomeric joint 382 can be constructed from a variety of known elastomeric materials. Suitable examples are natural rubber, polychloroprene rubber, styrene-butadiene rubber, and mixtures thereof. The elastomeric joint 382 is shown as being generally cylindrical in configuration, and is mounted coaxially with the tie rod 381 and coupler pin 384. By way of example, suitable dimensions for the cylindrical elastomeric joint 382 are a length of about 4 to 5 inches and a diameter of about 2 to 3 inches. However, it will be readily apparent that other dimensions may be utilized to provide more or less resistance to elongation. Further, elastomeric joints 382 shaped other than cylindrically may alternately be utilized with equally suitable results. For example, the diameter of the elastomeric joint 382 can taper from the ends toward the center of the joint, to enable the joint to be more easily deformed.

The resilient linkage 380, including the elastomeric joint 382, provides an advantage over the other previously described embodiments utilizing curvilinear metal linkage. The elastomeric joint acts not only as a spring, resisting elongation of the linkage and returning the linkage to its original configuration, but also as a shock absorbing dampener. The combination of the spring and dampening properties afforded by the elastomeric joint 382 provides for a more fluid, uninterrupted reciprocal motion of the hand levers relative to the foot levers. As an additional benefit, each elastomeric joint provides resistance to differential rotation of the hand lever relative to the corresponding foot lever in proportion to the degree or extend of differential rotation of the hand lever relative to the foot lever. The force required to deform the elastomeric joint increases proportionately or in some other defined relationship relative to the change in length of the resilient linkage 380.

Other variations of the various full body exercisers described above may be constructed in accordance with the present invention. For instance, to reduce costs a full body exercise apparatus similar to apparatus 180 with independent hand and foot levers may be constructed, but wherein there is no adjustment means for the nominal position of the hand levers.

As a further example of a modification within the scope of the present invention, a resistance mechanism in addition to the elastomeric hand lever torsion springs could be utilized in the full body exerciser 180 shown in FIGS. 6 through 8. One such example would be the addition of gas springs or hydraulic cylinders to offer further resistance to movement of the hand levers.

Although the equipment 10, 130, 180, 240, and 290 have been described as including a pair or pairs of torsion springs, one for each individual foot beam and/or hand lever, alternatively a single annular elastomeric member having a single inner casing and a pair of outer casings attached to the outer surface of the elastomeric member in mutually spaced relation may be used. In such an alternative embodiment, the inner casing could be coupled to the frame of the exercise apparatus and one of the outer casings could be coupled with one foot or hand lever in the manner described above, and the other outer casing could be coupled with the other foot or hand lever, also as described above.

The embodiment of the full body exercise apparatus 180 illustrated in FIGS. 6 and 7 includes two separate hand levers that move independently of each other. It should be readily apparent that this embodiment could alternately be constructed using a single hand lever, grasped by both hands of a user, rather than independent right and left levers mounted on a single elastomeric torsion spring.

The present invention has been described as embodied in exercise apparatus 10, 130, 180, 240, 290, and 320 and others that are designed to simulate walking or climbing. However, it should be appreciated the present invention may be utilized for the mounting of pivotal levers in other types of exercise apparatus. For instance, elastomeric torsion springs could be used in a rowing exercise machine (not shown) of the type having opposed, elongate, pivotally mounted hand levers to return the hand levers to a nominal position.

Although the present invention has been disclosed with respect to several preferred embodiments, further modifications such as those described above, will be apparent to those skilled in the art. Accordingly, it is not intended that the invention be limited by the disclosure or by such modifications, but instead that its scope should be determined entirely by reference to the claims which follow herein below.

The embodiments of the invention in which an exclusive property or privilege is claimed are defined as follows:

1. An exercise apparatus comprising:
   a frame;
   a first lever for an exerciser to exert resistance against, said first lever rotatably mounted on the frame to rotate about a first axis;
   a second lever for an exerciser to exert resistance against, said second lever rotatably mounted on the frame to rotate about a second axis; and
   linkage means for coupling the first lever to the second lever so that as the first lever rotates about the first axis the second lever is normally caused to rotate a proportional distance about the second axis, the linkage means being reversibly deformable to enable the first and second levers to rotate relative to each other by an amount other than the proportional distance when a user exerts differential resistance to rotation of the second lever relative to the first lever, wherein the linkage means includes an elastomeric joint member.

2. The exercise apparatus of claim 1, wherein the linkage means comprises a tie rod member and a cooperative elastomeric joint member.

3. The exercise apparatus of claim 2, wherein the tie rod member and the elastomeric joint member are mounted coaxially.

4. The exercise apparatus of claim 1, wherein the elastomeric joint member provides resistance to differential rotation of the first lever relative to the second lever in proportion to the extent of differential rotation of the first lever relative to the second lever.

5. The exercise apparatus of claim 1, wherein the elastomeric joint member is constructed and configured to provide resistance to differential rotation of the first and second levers as well as to dampen shock occurring as a result of relative motion of the first and second levers.

6. An exercise apparatus comprising:
a frame;
first and second foot levers rotatably mounted to the frame to rotate about a first axis;
first and second hand levers rotatably mounted to the frame to rotate about a second axis; and
first and second tie rod members coupling the first and second hand levers to the first and second foot levers, respectively, wherein each first and second tie rod member includes an elastomeric joint member that is deformable to change the length of the tie rod member.

7. The exercise apparatus of claim 6, wherein the tie rod member and the elastomeric joint member are mounted coaxially.

8. The exercise apparatus of claim 6, wherein the elastomeric joint member provides resistance to differential rotation of the coupled foot lever relative to the coupled hand lever in proportion to the extent of differential rotation of the coupled foot lever relative to the coupled hand lever.

9. The exercise apparatus of claim 6, wherein the elastomeric joint member is constructed and configured to provide resistance to differential rotation of the coupled foot and hand levers as well as to dampen shock occurring as a result of relative motion of the coupled foot and hand levers.

* * * * *

UNITED STATES PATENT AND TRADEMARK OFFICE
CERTIFICATE OF CORRECTION

PATENT NO. : 5,318,490
DATED : June 7, 1994
INVENTOR(S) : Henderson, Dalton, and Graf It is certified that error appears in the above-indentified patent and that said Letters Patent is hereby corrected as shown below:

| COLUMN | LINE | | |
|---|---|---|---|
| [56] 2 | Ref. Cited (Foreign Pat. Docs.) | "2243794 3/1973 Fed. Rep. of Germany" s/r | --2,145,884 3/1973 Fed. Rep. of Germany-- |
| [56] 2 | Ref. Cited (Oth. Pubs.) | "44218" s/r --44318-- | |
| 17 | 36 | "326" s/r --324-- | |
| 19 | 64 | "extend" s/r --extent-- | |

Signed and Sealed this

Sixth Day of September, 1994

Attest:

BRUCE LEHMAN

*Attesting Officer*     *Commissioner of Patents and Trademarks*